United States Patent
Umino

(10) Patent No.: US 12,334,846 B2
(45) Date of Patent: Jun. 17, 2025

(54) AC MOTOR CONTROL DEVICE AND DRIVE SYSTEM EQUIPPED WITH SAME

(71) Applicant: ORIENTAL MOTOR CO., LTD., Tokyo (JP)

(72) Inventor: Hikaru Umino, Tsukuba (JP)

(73) Assignee: ORIENTAL MOTOR CO., LTD., Tokyo (JP)

( * ) Notice: Subject to any disclaimer, the term of this patent is extended or adjusted under 35 U.S.C. 154(b) by 111 days.

(21) Appl. No.: 18/254,599

(22) PCT Filed: Nov. 12, 2021

(86) PCT No.: PCT/JP2021/041797
§ 371 (c)(1),
(2) Date: May 25, 2023

(87) PCT Pub. No.: WO2022/113788
PCT Pub. Date: Jun. 2, 2022

(65) Prior Publication Data
US 2024/0022192 A1    Jan. 18, 2024

(30) Foreign Application Priority Data
Nov. 27, 2020  (JP) .............................. JP2020-196803

(51) Int. Cl.
*H02P 21/24* (2016.01)
*H02P 21/22* (2016.01)
(Continued)

(52) U.S. Cl.
CPC .............. *H02P 21/24* (2016.02); *H02P 21/22* (2016.02); *H02P 25/022* (2013.01); *H02P 27/12* (2013.01)

(58) Field of Classification Search
CPC ........ H02P 21/24; H02P 21/22; H02P 25/022; H02P 27/12; H02P 27/08; H02P 6/185; H02P 6/18
See application file for complete search history.

(56) References Cited

U.S. PATENT DOCUMENTS 6,281,656 B1 *  8/2001  Masaki ..................... H02P 6/18
                                               318/702
10,348,230 B2 *  7/2019  Hachiya .................. H02P 21/18
(Continued)

FOREIGN PATENT DOCUMENTS

CN         105529978 A      4/2016
CN         107947667 A      4/2018
(Continued)

OTHER PUBLICATIONS

T. Aihara, et al., "Sensorless Torque Control of Salient-Pole Synchronous Motor at Zero-Speed Operation", IEEE Transactions on Power Electronics, vol. 14, No. 1, Jan. 1999, pp. 202-208.

*Primary Examiner* — Bickey Dhakal
(74) *Attorney, Agent, or Firm* — Rabin & Berdo, P.C.

(57) ABSTRACT

An AC motor control device controls an inverter that supplies an alternating current to an AC motor which is a three-phase permanent magnet synchronous motor. The AC motor control device includes: pulse width modulation signal generation means that supplies a pulse width modulation signal to the inverter so that a position detection voltage vector for detection of the position of the rotor of the AC motor is applied to the AC motor; current derivative detection means that detects a current derivative occurring due to application of the position detection voltage vector to the AC motor; rotor position computation means that computes an estimated position of the rotor of the AC motor; rotor position correction means that corrects the estimated position (Continued)

tion; and drive control means that controls the pulse width modulation signal generation means so as to drive the AC motor.

12 Claims, 27 Drawing Sheets

(51) Int. Cl.
*H02P 25/022* (2016.01)
*H02P 27/12* (2006.01)

(56) References Cited

U.S. PATENT DOCUMENTS

| | | |
|---|---|---|
| 2004/0113582 A1 | 6/2004 | Ide |
| 2011/0204831 A1* | 8/2011 | Iwaji ................. H02P 21/04 |
| | | 318/244 |
| 2013/0069572 A1 | 3/2013 | Maekawa |
| 2017/0201200 A1 | 7/2017 | Hachiya et al. |
| 2021/0152113 A1 | 5/2021 | Tobari et al. |

FOREIGN PATENT DOCUMENTS

| | | |
|---|---|---|
| EP | 2290806 A2 | 3/2011 |
| EP | 3823157 A1 | 5/2021 |
| JP | H07245981 A | 9/1995 |
| JP | 2002291283 A | 10/2002 |
| JP | 2007129844 A | 5/2007 |
| JP | 2010154598 A | 7/2010 |
| JP | 2011050168 A | 3/2011 |
| JP | 2013126352 A | 6/2013 |
| JP | 2018042336 A | 3/2018 |
| JP | 2018153028 A | 9/2018 |
| JP | 2020005404 A | 1/2020 |
| WO | 2015190150 A1 | 12/2015 |
| WO | 2020013084 A1 | 1/2020 |

* cited by examiner

M

Three-phase position estimation signals (zero current)

Two-phase position estimation signals/ Estimated position (zero current)

Estimated positions after translation correction

Estimated angle errors after translation correction

Three-phase position estimation signals
(intra-phase difference computation)

Two-phase position estimation signals/
Estimated position
(intra-phase difference computation)

FIG. 22A Three-phase position estimation signals
(inter-phase difference computation)
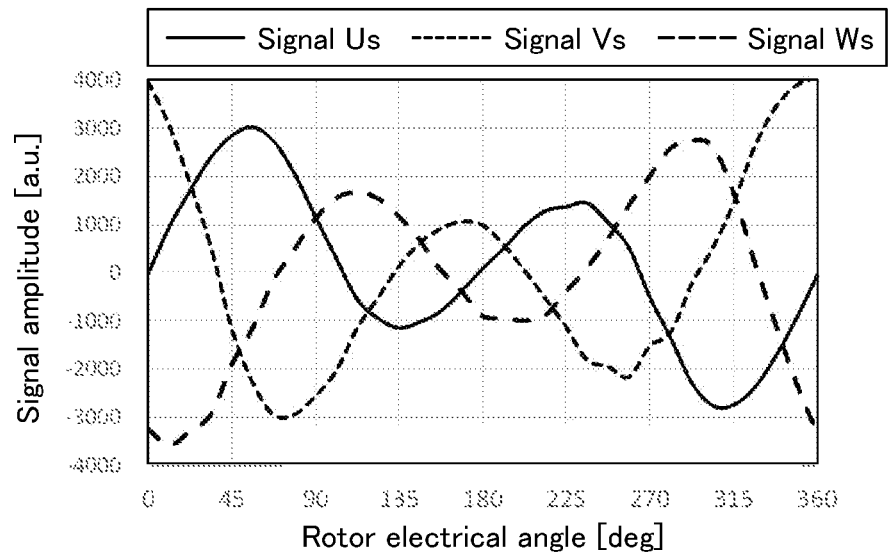
FIG. 22B Two-phase position estimation signals/
Estimated position
(inter-phase difference computation)
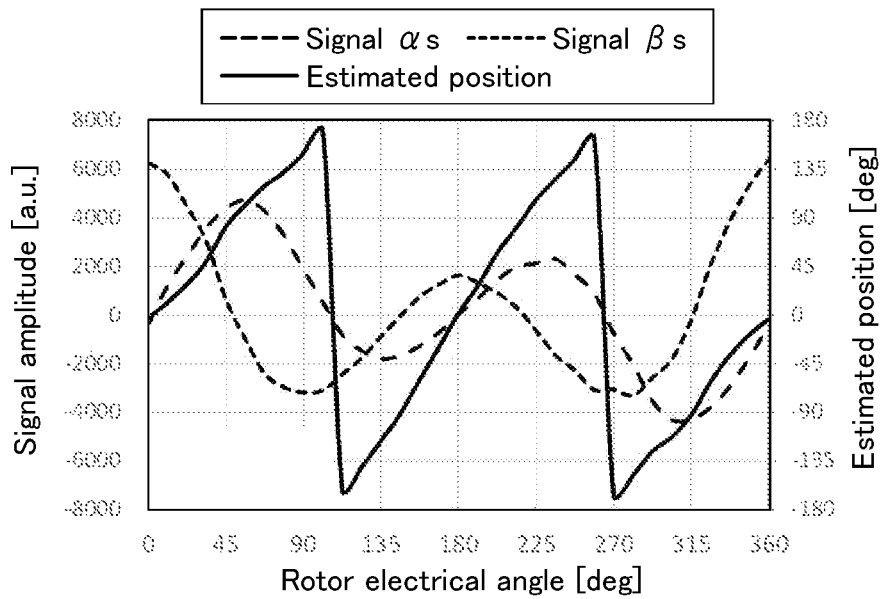

AC MOTOR CONTROL DEVICE AND DRIVE SYSTEM EQUIPPED WITH SAME

CROSS-REFERENCE TO RELATED APPLICATIONS

This application claims the benefit of priority to Japanese Patent Application No. 2020-196803, filed in the Japan Patent Office on Nov. 27, 2020, the disclosure of which is entirely incorporated herein by reference.

TECHNICAL FIELD

The present invention relates to an AC motor control device, and to a drive system including the same.

BACKGROUND ART

AC motors are electric motors configured to operate while receiving AC supply, and examples thereof include brushless DC motors, induction motors, and stepping motors. That is, electric motors other than those configured to receive DC supply and change the direction of winding current with the use of a commutator are categorized as the AC motors.

A typical motor control device for such an AC motor includes an inverter that converts DC to AC, and the inverter supplies the AC to the electric motor. In order to properly control the inverter, rotor position information is required. Therefore, the inverter is controlled by utilizing the output of a rotor position detector that detects the rotational position of a rotor.

A known AC motor driving system is such that the AC motor is driven by estimating the rotor position without the use of the rotor position detector and controlling the inverter based on the estimated rotor position. This control system is referred to as "position sensorless control" or simply "sensorless control." Without the rotor position detector, there is no need to give consideration to the mounting position accuracy of the rotor position detector and the wiring routing of the rotor position detector and the like. In addition, the sensorless control can be advantageously applied to motors in which the rotor position detector cannot be provided for physical reasons and to motors in which the rotor position detector cannot be used for environmental reasons.

In a typical sensorless control process, the rotor position is estimated by an induced voltage method. In the induced voltage method, an induced voltage is computed based on a motor model by using a voltage command and a current detection value, and the rotor position is estimated based on the induced voltage.

However, it is difficult to detect the rotor position, when a motor rotation speed is in a lower speed range in which the induced voltage is small, due to a deviation of an actual application voltage from the voltage command, an error in the current detection, a limitation of the resolution of the current detection, and the like.

Examples of the sensorless control in a lower speed range including a zero speed level are disclosed in PTL 1 and PTL 2.

In the sensorless control of PTL 1, an alternating voltage of a frequency higher than an excitation frequency for motor driving is superposed on a drive voltage waveform. A motor inductance is changed according to the application of the alternating voltage, and a response of a high-frequency alternating current is correspondingly obtained on the dq-axes of a motor rotational coordinate system. Based on the response, the rotor position is estimated.

The sensorless control of PTL 2 utilizes an influence of inductance on a current ripple amount occurring on the 4-axes of a motor fixed coordinate system in every PWM control cycle. Specifically, a change in phase current during the application of a voltage vector in every PWM control cycle is determined, and the rotor position is estimated by using an inter-phase difference in the phase current change. The latter can more easily achieve high responsiveness than the former, because the position detection cycle can be shortened.

CITATION LIST

Patent Literature

PTL 1: JP1995-245981A
PTL 2: JP2018-153028A
PTL 3: JP2011-050168A
PTL 4: JP2010-154598A
PTL 5: JP2020-005404A
PTL 6: JP2013-126352A
PTL 7: WO2015/190150
PTL 8: JP2007-129844A

NONPATENT LITERATURE

NPL 1: T. Aihara, et al., "Sensorless Torque Control of Salient-Pole Synchronous Motor at Zero-Speed Operation" IEEE TRANSACTIONS ON POWER ELECTRONICS, VOL. 14, NO. 1, January 1999

SUMMARY OF INVENTION

Problems to be Solved by Invention

However, where the motor is driven in a range in which magnetic saturation occurs, the inductance is influenced by the magnetic saturation and, therefore, the estimated position accuracy is deteriorated. In the worst case, this may result in the step-out of the motor.

In PTL 1 in which the position is estimated by the superposition of the high-frequency alternating voltage, a method disclosed in PTL 3, PTL 4, PTL 5, PTL 6 or PTL 7 may be used to suppress the deterioration of the detection accuracy. PTL 3 discloses a method in which inductances Ld, Lq on the rotational coordinate system are made dependent on currents Id, Iq on the rotational coordinate system to correct an estimated value. PTL 4 discloses a method in which the magnitude of the high-frequency voltage is changed according to a torque (q-axis current value) to improve the estimation accuracy. PTL 5 and PTL 6 disclose methods in which a d-axis current command dependent on a q-axis current value is additionally employed to maintain a saliency ratio. PTL 7 discloses a method in which a current value is limited so as to prevent the saliency ratio from being reduced below a predetermined level.

In these methods, the correction is made on the dq-axes for the improvement. The methods (PTL 5, PTL 6) involving the correction of the value of the d-axis current command and the method (PTL 7) involving the current limitation can be used for the estimation of the rotor position on the αβ-axes.

However, the methods of PTL 5 and PTL 6 involving the correction of the d-axis current command value have a problem of increased copper loss. Further, the method of PTL 7 involving the limitation of the current itself has a problem of incapability of generating a higher torque.

In the method of PTL 2 in which the rotor position is estimated based on the current ripple amount on the 4-axes by using the inductance, on the other hand, the phase current change amount is determined by using a plurality of current detection values. Of course, the current ripple amount irrelevant to the driving of the motor is preferably small. In the method employing the plurality of current detection values, however, it is difficult to ensure an S/N ratio (signal-to-noise ratio) that permits the detection of the small current ripples.

This problem can be solved by employing a current derivative detector capable of directly acquiring a current derivative based on a change in current with time with the use of an analog circuit that generates an induced voltage. In particular, where an element such as a current transformer including a magnetic core is utilized, as described in PTL 8, even minute current ripples can be detected at a higher sensitivity because a secondary voltage can be sufficiently increased.

When the motor is driven with a higher torque, however, there is a problem such that the magnetic core is saturated with a primary motor current which is regarded virtually as a direct current as compared with the frequency of the current ripples, and a secondary voltage induced by the primary current ripples is reduced. That is, the gain of the current derivative detector is changed depending on the motor current. This problem may be solved by using an air-core coil such as a Rogowski coil. However, a current transformer employing the air-core coil suffers from a lower secondary voltage and, therefore, it is again impossible to ensure a satisfactory S/N ratio.

When the motor is rotated at a rotation speed in the lower speed range including the zero speed level, particularly with a higher torque, it is difficult to estimate the rotor position and hence to stably control the AC motor in a sensorless manner without the step-out of the motor.

Embodiments of the present invention provide an AC motor control device that is capable of stably controlling an AC motor in a sensorless manner without the step-out of the AC motor even when the motor is rotated with a higher torque at a rotation speed in a lower speed range including a zero speed level, and a drive system including the AC motor control device.

Solution to Problems

One embodiment of the present invention provides an AC motor control device that controls an inverter adapted to supply an alternating current to an AC motor which is a three-phase permanent magnet synchronous motor. The AC motor control device includes: pulse width modulation signal generation means that supplies a pulse width modulation signal to the inverter so that plural types of voltage vectors including a position detection voltage vector for detection of the position of the rotor of the AC motor are applied to the AC motor; current derivative detection means that detects a current derivative which is a differential value of a current of the AC motor occurring due to application of the position detection voltage vector to the AC motor; rotor position computation means that computes an estimated position of the rotor of the AC motor based on the current derivative detected by the current derivative detection means; rotor position correction means that corrects the estimated position according to a q-axis current value; and drive control means that controls the pulse width modulation signal generation means so as to drive the AC motor according to the estimated position corrected by the rotor position correction means.

The term "current derivative" is herein used to mean a change in current with time, including the time-differential value of the current and a difference (variation) between current values detected at a short time interval.

The term "q-axis current value" means the value of a q-axis current on a dq rotational coordinate system defined by a d-axis extending in the magnetic flux direction of the rotor of the AC motor and a q-axis orthogonal to the d-axis, and rotated together with the rotor.

The current derivative obtained when the position detection voltage vector is applied to the AC motor fluctuates depending on the position of the rotor. Therefore, the rotor position can be estimated by using the current derivative. According to studies conducted by the inventor of the present invention, on the other hand, the estimated rotor position contains an error depending on the q-axis current value. One cause of this error is the magnetic saturation of the AC motor occurring when the AC motor is driven with a higher torque. Further, where an element such as a current transformer having a magnetic core is used for the current derivative detection means, the magnetic saturation of the magnetic core is another cause of the error. In this embodiment, therefore, the estimated rotor position is corrected according to the q-axis current value. The AC motor is controlled based on the corrected estimated position. Thereby, the AC motor can be controlled in a sensorless manner without the step-out thereof even when the AC motor is rotated with a higher torque at a rotation speed in a lower speed range including a zero speed level.

In an embodiment of the present invention, the rotor position correction means corrects the estimated position by subtracting a correction amount defined by a function of the q-axis current value from the position computed by the rotor position computation means. The correction with the use of the function of the q-axis current value can properly reduce the error of the estimated position attributable to the q-axis current. Thus, the AC motor can be properly controlled in the sensorless manner without the step-out thereof even when the AC motor is rotated with a higher torque at a rotation speed in the lower speed range including the zero speed level.

In an embodiment of the present invention, the rotor position correction means corrects the estimated position computed by the rotor position computation means by subtracting a correction amount from the estimated position computed by the rotor position computation means, the correction amount being defined by a product of a function of the q-axis current value and a harmonic component having a phase defined by the estimated position computed by the rotor position computation means. In this case, the correction amount contains a harmonic component having a reference phase defined by the estimated position and has an amplitude according to the q-axis current value. Thus, an error of the harmonic component contained in the estimated position can be properly eliminated, thereby making it possible to more accurately provide the estimated position. Therefore, the AC motor can be properly controlled in the sensorless manner without the step-out thereof even when the AC motor is rotated with a higher torque at a rotation speed in the lower speed range including the zero speed level.

In an embodiment of the present invention, the rotor position correction means performs a first correction to correct the estimated position computed by the rotor position computation means by subtracting a first correction amount from the estimated position computed by the rotor position computation means, the first correction amount being defined by a function of the q-axis current value, and performs a second correction to further correct the estimated position corrected by the first correction by subtracting a second correction amount from the estimated position corrected by the first correction, the second correction amount being defined by a product of a function of the q-axis current value and a harmonic component having a phase defined by the estimated position corrected by the first correction.

In this case, the first-stage correction is performed based on the q-axis current value, and the second-stage correction is further performed by using the q-axis current value and the phase of the estimated position corrected by the first-stage correction. This makes it possible to reduce the error of the estimated position attributable to the q-axis current value and to eliminate the estimation error of the harmonic component. In addition, the estimated position can be more accurately provided, because the estimated position corrected by the first-stage correction is used as the reference phase for the correction of the estimation error of the harmonic component. Thereby, the AC motor can be more properly controlled in the sensorless manner without the step-out thereof even when the AC motor is rotated with a higher torque at a rotation speed in the lower speed range including the zero speed level.

In an embodiment of the present invention, the rotor position correction means corrects the estimated position so as to shift the estimated position in a direction in which the AC motor generates a torque according to the q-axis current value. With this arrangement, the computation error of the estimated position attributable to the q-axis current value can be properly corrected. Thus, the estimated position can be accurately provided. Thereby, the AC motor can be properly controlled in the sensorless manner without the step-out thereof even when the AC motor is rotated with a higher torque at a rotation speed in the lower speed range including the zero speed level.

In an embodiment of the present invention, the pulse width modulation signal generation means supplies the pulse width modulation signal to the inverter so that an inverse voltage vector obtained by inverting the position detection voltage vector can be applied to the AC motor subsequently to the position detection voltage vector.

With this arrangement, the current attributable to the voltage vector applied for the position detection is offset by the inverse vector. Thus, the rotor position can be estimated without any influence on the effective current, thereby suppressing vibrations and noises attributable to the position detection.

In an embodiment of the present invention, the rotor position computation means generates three-phase position estimation signals represented by a cyclic symmetric polynomial and each defined by determining a difference between current derivatives of the same phase or different phases when different voltage vectors are applied to the AC motor, and computes the estimated position of the rotor of the AC motor by using the three-phase position estimation signals.

With this arrangement, the three-phase position estimation signals are generated as represented by the cyclic symmetric polynomial. Therefore, even if the magnetic saturation of the AC motor occurs to change inductances during the generation of a higher torque, the three phases are equivalently influenced by the change in inductances. This suppresses the position estimation error, making it possible to accurately estimate the rotor position. Thereby, the AC motor can be properly controlled in the sensorless manner without the step-out thereof even when the AC motor is rotated with a higher torque at a rotation speed in the lower speed range including the zero speed level.

In an embodiment of the present invention, the rotor position computation means generates three-phase position estimation signals each defined by determining a difference between current derivatives of the same phase when different voltage vectors are applied to the AC motor, and computes the estimated position of the rotor of the AC motor by using the three-phase position estimation signals.

With this arrangement, the three-phase position estimation signals to be generated are each defined by determining the difference between the current derivatives of the same phase. Therefore, the three-phase position estimation signals can be each generated by factoring out a current derivative detection gain. Even if the magnetic saturation occurs in a magnetic body provided in the current derivative detection means when a large current is applied, the position estimation error can be easily suppressed. Since the rotor position can be accurately estimated, the AC motor can be properly controlled in the sensorless manner without the step-out thereof even when the AC motor is rotated with a higher torque at a rotation speed in the lower speed range including the zero speed level.

Another embodiment of the present invention provides a drive system including: an AC motor which is a three-phase permanent magnet synchronous motor; an inverter that supplies an alternating current to the AC motor; and an AC motor control device that controls the inverter. The AC motor control device has the aforementioned features.

With this arrangement, the drive system thus provided is capable of stably driving the AC motor through the sensorless control without the step-out of the AC motor even when the AC motor is driven with a higher torque at a rotation speed in the lower speed range including the zero speed level.

Effect of Invention

According to the present invention, it is possible to provide the AC motor control device which is capable of stably controlling the AC motor in the sensorless manner without the step-out of the AC motor even when the AC motor is driven with a higher torque at a rotation speed in the lower speed range including the zero speed level, and to provide the drive system including the AC motor control device.

BRIEF DESCRIPTION OF DRAWINGS

FIG. 22A shows three-phase position estimation signals Us, Vs, Ws recomputed with the signals Vs, Ws of FIG. 21A amplified twice, and FIG. 22B shows an estimated position computed by using these three-phase position estimation signals Us, Vs, Ws.

DESCRIPTION OF EMBODIMENTS

Embodiments of the present invention will hereinafter be described in detail with reference to the attached drawings.

Figure 1A:
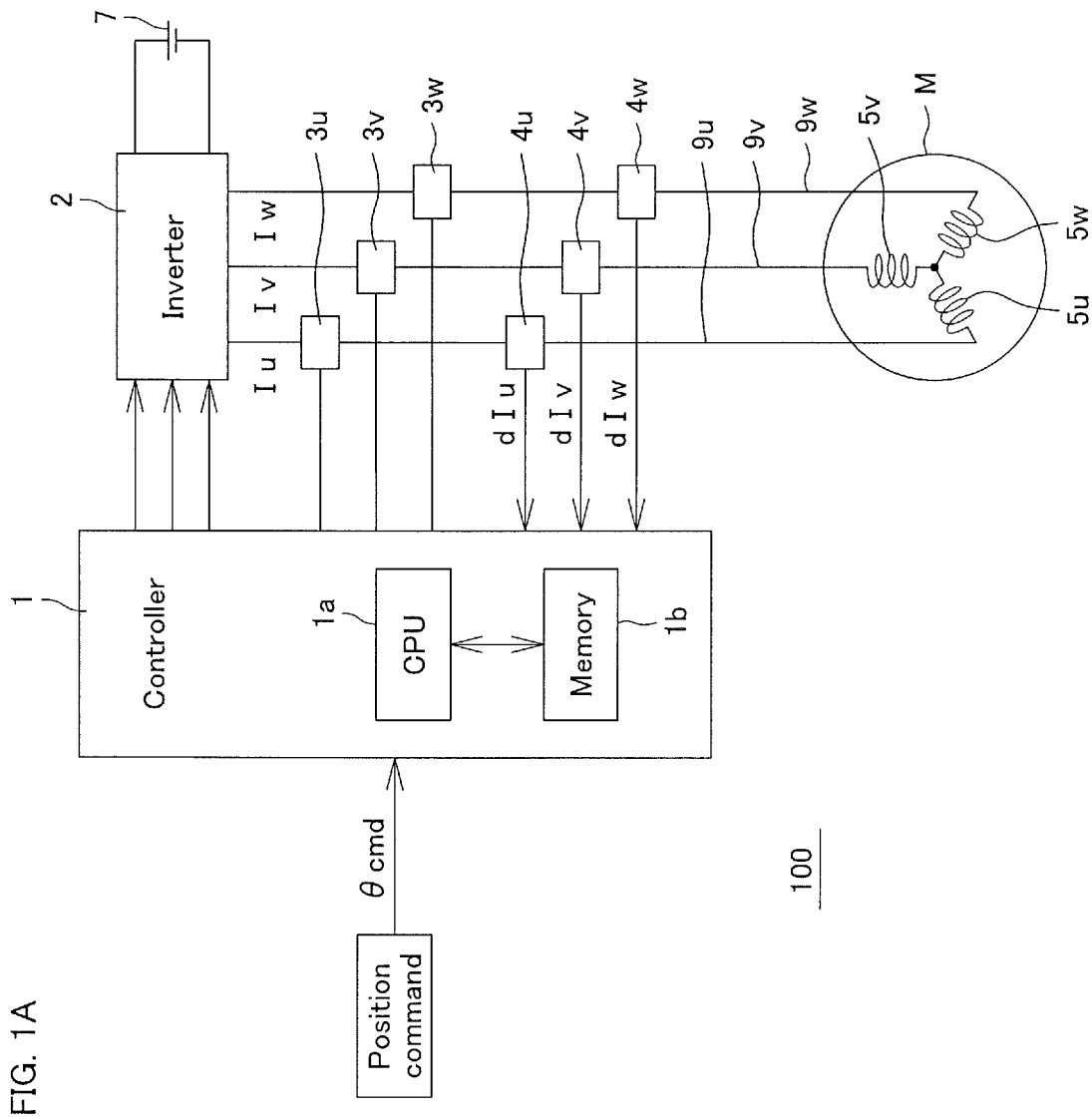
FIG. 1A is a block diagram for describing the configuration of a drive system including a motor control device according to an embodiment of the present invention.

FIG. 1A is a block diagram for describing the configuration of a drive system including a motor control device according to one embodiment of the present invention. The motor control device 100 is a device (AC motor control device) adapted to drive an AC motor M. More specifically, the motor control device 100 drives the AC motor M by so-called sensorless control, i.e., by controlling the AC motor M without the use of a rotor position detector for the detection of the position of the rotor of the AC motor M. The AC motor M may be a surface magnet synchronous motor (SPMSM). In this embodiment, the AC motor M is a three-phase permanent magnetic synchronous motor, and has a U-phase winding $5u$, a V-phase winding $5v$ and a W-phase winding $5w$. Hereinafter, these windings are often referred to generally as "winding(s) $5uvw$." In FIG. 1A, the windings $5uvw$ are connected together in a Y-connection form by way of example, but may be connected together in a Δ-connection form as will be described later.

In this example, the motor control device 100 has a feedback system including a position control loop, a speed control loop and a current control loop, and is configured so as to perform a position servo control operation to control the rotor position of the AC motor M according to a position command. Vector control is employed for the current control. A command to be externally applied is not limited to the position command, but may be a speed command or may be a torque command (current command). Where the speed command is applied, the position control loop is not used. Where the torque command is applied, the current control loop is used alone, and neither the position control loop nor the speed control loop is used.

The rotor position is estimated with the use of signals obtained by current derivative detectors without the use of the rotor position detector. More specifically, position estimation signals indicating fluctuation in the inductances of the respective phase windings of the AC motor M are generated based on current derivatives, and the rotor position is estimated based on the position estimation signals. In principle, the surface magnet synchronous motor is free from saliency and, therefore, it is considered that magnetic poles cannot be detected based on changes in inductances.

Where magnets such as neodymium magnets having strong magnetic forces are used, however, the inductances are slightly changed by the magnetic saturation of iron cores.

Specifically, the motor control device 100 includes a controller 1, current detectors 3u, 3v, 3w and current derivative detectors 4u, 4v, 4w, and is configured to control an inverter 2. The inverter 2 converts a direct current supplied from a DC power source 7 into an alternating current, and supplies the alternating current to the windings 5uvw of the AC motor M. The motor control device 100, the inverter 2 and the AC motor M constitute the drive system.

The inverter 2 and the AC motor M are connected to each other via three current lines 9u, 9v, 9w (hereinafter often referred to generally as "current line(s) 9uvw") for the U-phase, the V-phase and the W-phase. The current detectors 3u, 3v, 3w and the current derivative detectors 4u, 4v, 4w are provided in the current lines 9uvw, respectively. The current detectors 3u, 3v, 3w (hereinafter often referred to generally as "current detector(s) 3uvw") respectively detect line currents flowing through the corresponding phase current lines 9uvw, i.e., a U-phase line current Iu, a V-phase line current Iv and a W-phase line current Iw (hereinafter often referred to generally as "line current(s) Iuvw"). The current derivative detectors 4u, 4v, 4w (hereinafter often referred to generally as "current derivative detector(s) 4uvw") are current derivative detection means (current derivative detectors) that detect changes in the line currents flowing through the corresponding phase current lines 9uvw with time, i.e., U-phase, V-phase and W-phase current derivatives dIu, dIv, dIw (hereinafter often referred to generally as "current derivative(s) dIuvw"), respectively.

Where the windings 5uvw of the AC motor M are connected together in the Y-connection form, the line currents Iuvw are respectively equal to phase currents iu, iv, iw (hereinafter often referred to generally as "phase current(s) iuvw") flowing through the corresponding phase windings 5uvw. Where the windings 5uvw of the AC motor M are connected together in the Δ-connection form, a relationship between the line currents Iuvw and the phase currents iuvw is represented by an expression (3) to be described later.

The controller 1 controls the inverter 2 based on a position command θcmd. The controller 1 is provided in the form of a computer, and includes a processor (CPU) 1a, and a memory 1b as a recording medium that records a program to be executed by the processor 1a.

Figure 1B:
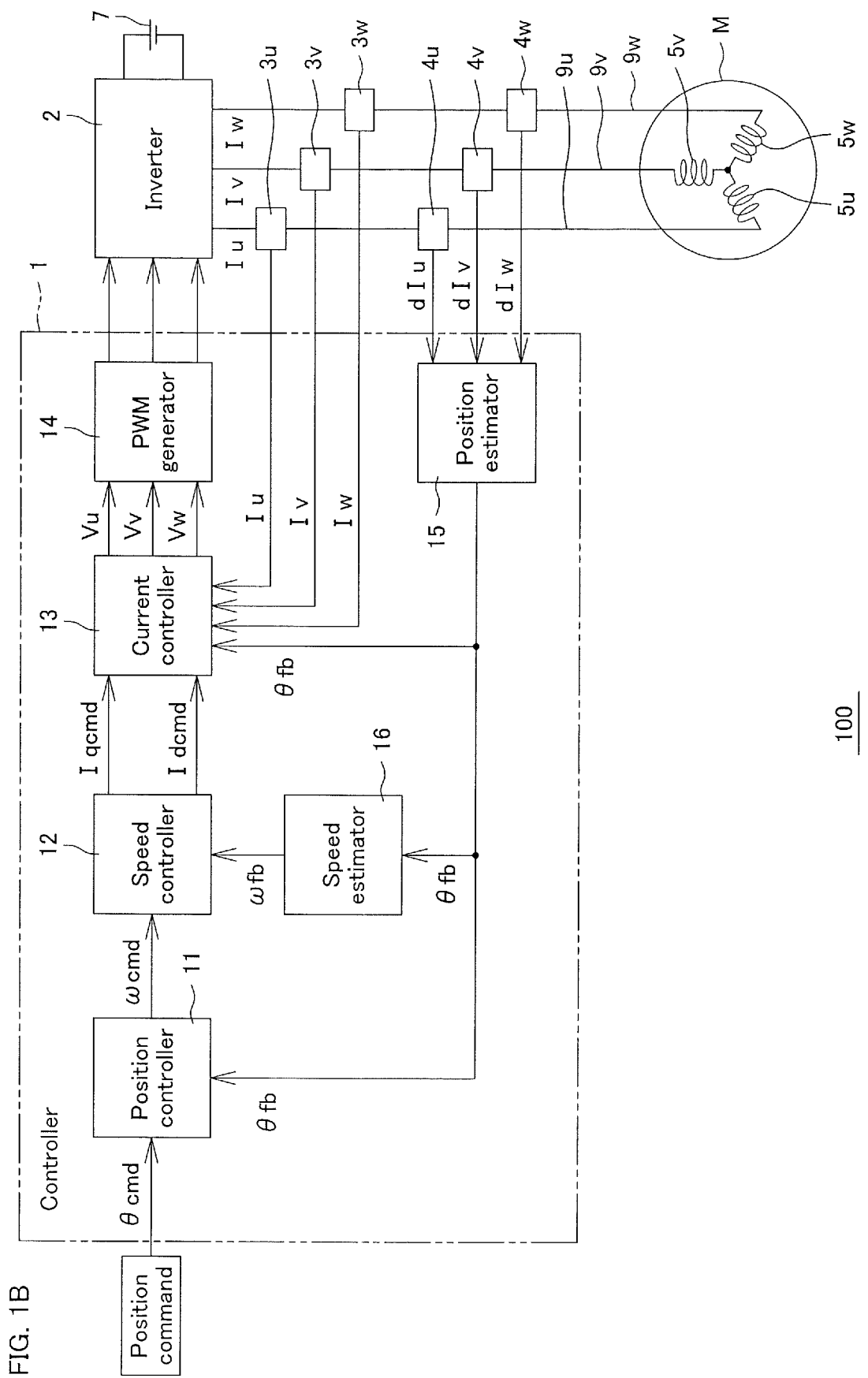
FIG. 1B is a block diagram for describing the functional configuration of a controller provided in the motor control device.

FIG. 1B is a block diagram for describing the functional configuration of the controller 1. The controller 1 is configured so that the processor 1a executes the program to perform the functions of a plurality of functional processing portions. The functional processing portions include a position controller 11, a speed controller 12, a current controller 13, a PWM generator 14, a position estimator 15, and a speed estimator 16.

The position estimator 15 performs a rotor position estimating computation to estimate the rotor position of the AC motor M by using signals outputted by the current derivative detectors 4uvw, i.e., the current derivatives dIuvw, and feeds back the estimated position θfb to the position controller 11. The position controller 11 generates a speed command ωcmd based on the estimated position θfb so as to match the rotor position with the position command θcmd, and supplies the speed command ωcmd to the speed controller 12. In this manner, the position control loop is provided.

The estimated position θfb of the rotor is also supplied to the speed estimator 16. The speed estimator 16 performs a rotor speed estimating computation to determine a change in the estimated position θfb with time to estimate the speed of the rotor, and supplies the estimated speed ωfb to the speed controller 12. The speed controller 12 generates current commands Idcmd, Iqcmd based on the estimated speed ωfb so as to match the rotor speed with the speed command ωcmd, and supplies the current commands Idcmd, Iqcmd to the current controller 13. In this manner, the speed control loop is provided.

The line currents Iuvw detected by the current detectors 3uvw (precisely, the detection values of the line currents Iuvw) are supplied to the current controller 13. The current controller 13 generates a U-phase voltage command Vu, a V-phase voltage command Vv and a W-phase voltage command Vw (hereinafter often referred to generally as "voltage command(s) Vuvw") so as to match the line currents Iuvw with the current commands Idcmd, Iqcmd, and supplies the voltage commands Vuvw to the PWM generator 14. In this manner, the current control loop is provided.

The PWM generator 14 is pulse width modulation signal generation means (pulse width modulation signal generation circuit) that generates PWM control signals (pulse width modulation signals) according to the voltage commands Vuvw, and supplies the PWM control signals to the inverter 2. Thus, voltages according to the voltage commands Vuvw are applied across the windings 5uvw of the AC motor M via the current lines 9uvw.

Figure 2:
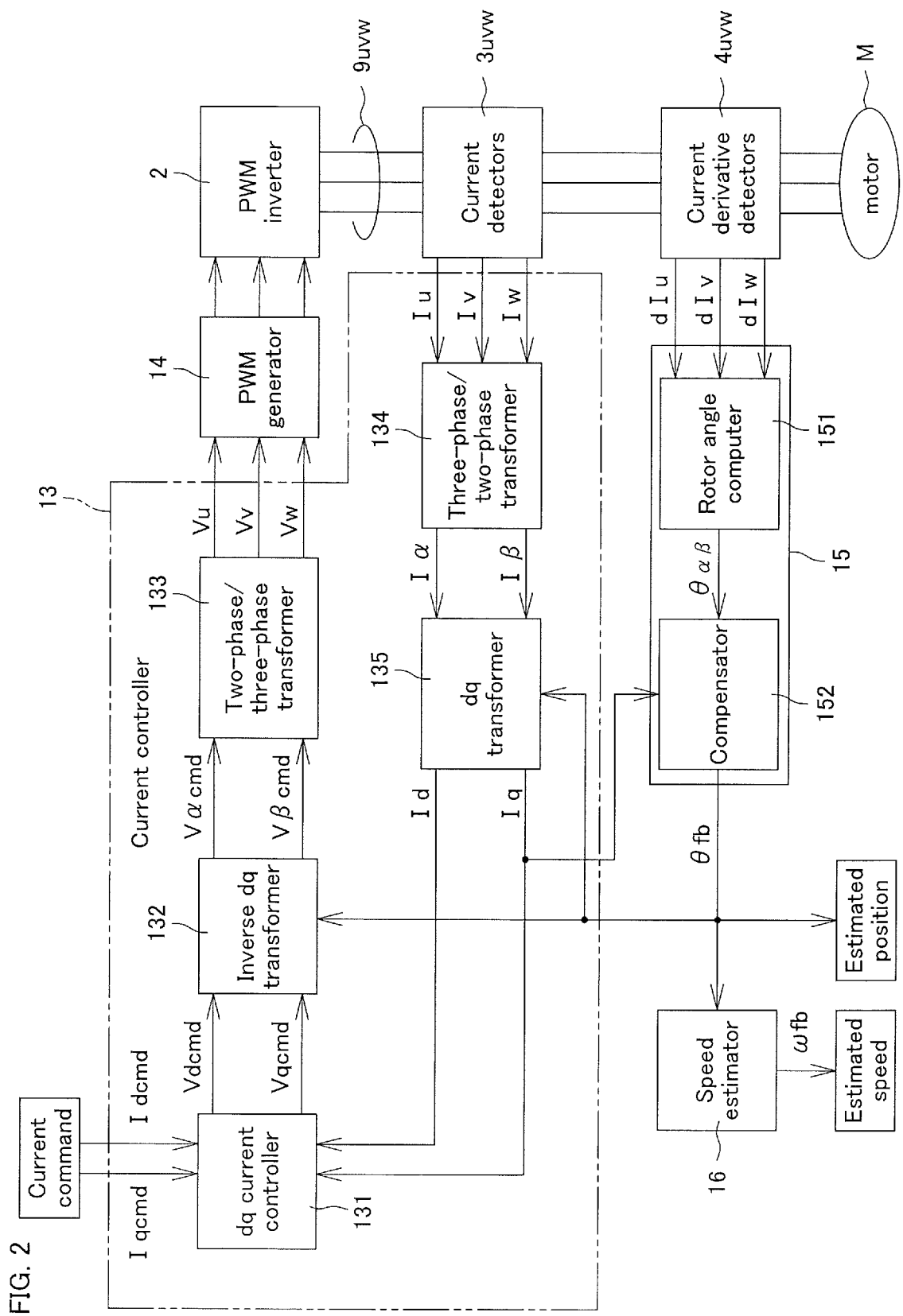
FIG. 2 is a block diagram showing a specific example of a detailed configuration associated with a current controller of the aforementioned controller.

FIG. 2 is a block diagram showing a specific example of a detailed configuration associated with the current controller 13. The speed controller 12 generates a d-axis current command Idcmd and a q-axis current command Iqcmd on a dq rotational coordinate system, and supplies the d-axis current command Idcmd and the q-axis current command Iqcmd to the current controller 13. The dq rotational coordinate system is a rotational coordinate system defined by a d-axis extending in the magnetic flux direction of the rotor of the AC motor M and a q-axis orthogonal to the d-axis, and rotated according to the rotation angle (electrical angle) of the rotor. The current controller 13 includes a dq current controller 131, an inverse dq transformer 132, a two-phase/three-phase transformer 133, a three-phase/two-phase transformer 134, and a dq transformer 135. The three-phase/two-phase transformer 134 transforms the three-phase line currents Iuvw detected by the current detectors 3uvw into two-phase current values Iα, Iβ on an αβ coordinate system which is a two-phase fixed coordinate system. The dq transformer 135 transforms the two-phase current values Iα, Iβ on the αβ coordinate system into a d-axis current value Id and a q-axis current value Iq on the dq rotational coordinate system. The current values Id, Iq on the dq rotational coordinate system are supplied to the dq current controller 131. The dq current controller 131 generates a d-axis voltage command Vdcmd and a q-axis voltage command Vqcmd (which are voltage commands on the dq rotational coordinate system) so as to match the d-axis current value Id and the q-axis current value Iq with the d-axis current command Idcmd and the q-axis current command Iqcmd, respectively. The voltage commands Vdcmd, Vqcmd are transformed into voltage commands Vαcmd, Vβcmd on the αβ coordinate system by the inverse dq transformer 132. Further, the voltage commands Vαcmd, Vβcmd on the αβ coordinate system are coordinate-transformed into the three-phase voltage commands Vuvw by the two-phase/three-phase transformer 133. The three-phase voltage commands Vuvw are supplied to the PWM generator 14.

The position estimator 15 includes a rotor angle computer 151 that computes the rotor angle on the αβ coordinate system, and a compensator 152 that corrects the rotor angle computed by the rotor angle computer 151 based on the q-axis current value to generate the estimated position θfb. The rotor angle computer 151 is rotor position computation means (rotor position computation circuit) that computes the estimated position of the rotor of the AC motor M based on the current derivatives detected by the current derivative detectors 4uvw. The compensator 152 is rotor position correction means (rotor position correction circuit) that corrects the computed estimated rotor position. The position estimator 15 supplies the estimated position θfb to the inverse dq transformer 132 and the dq transformer 135. The estimated position θfb is used for the computation for the coordinate transformation between the dq rotational coordinate system and the αβ coordinate system and for the computation for the speed estimation by the speed estimator 16.

The current controller 13 is drive control means (drive control circuit) that controls the PWM generator 14 to drive the AC motor M according to the estimated position θfb supplied from the position estimator 15.

Figure 3:
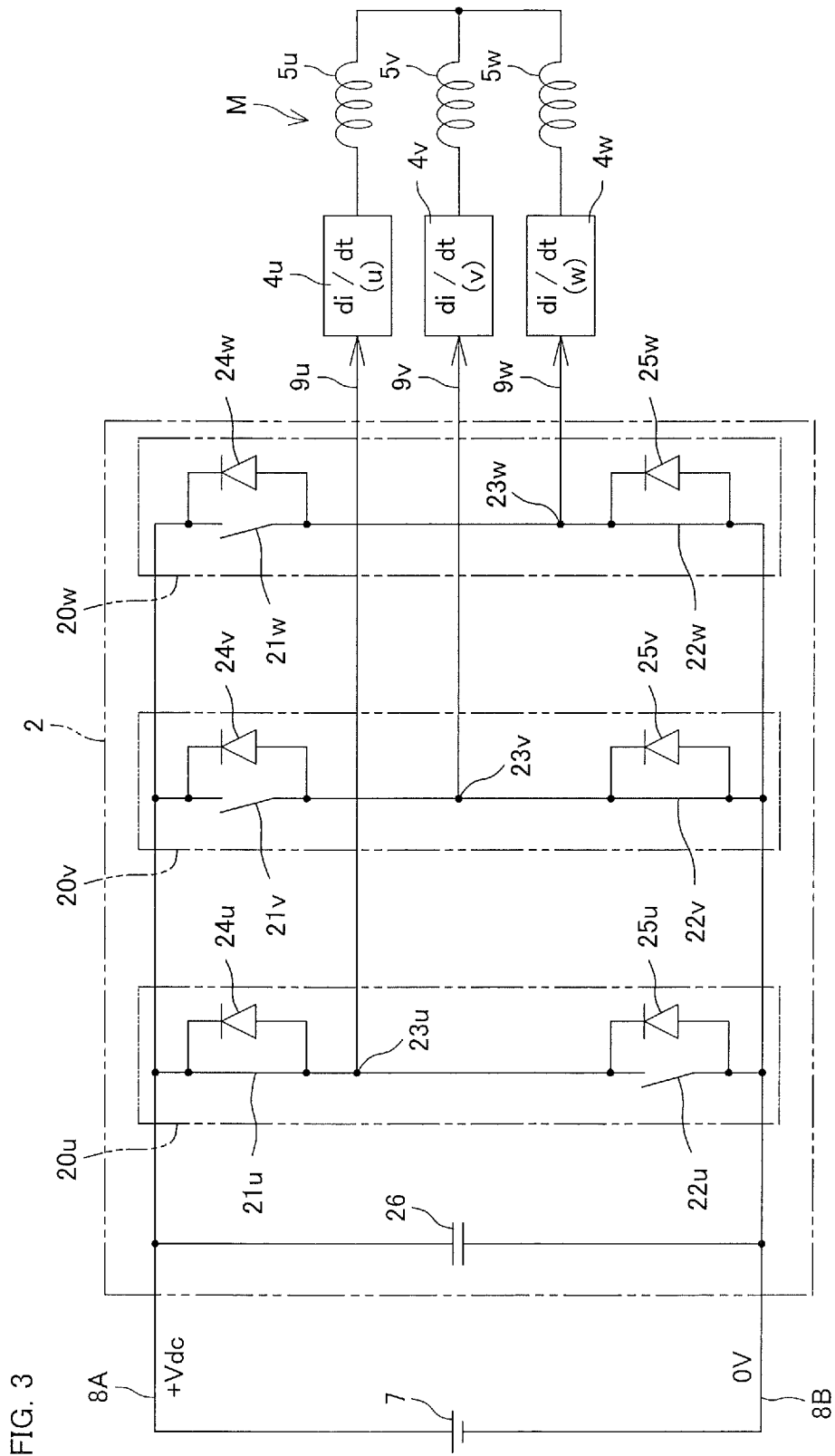
FIG. 3 is an electric circuit diagram for describing the configuration of an inverter provided in the motor control device by way of example.

FIG. 3 is an electric circuit diagram for describing the configuration of the inverter 2 by way of example. Bridge circuits 20u, 20v, 20w for the three phases are connected in parallel between a pair of power supply lines 8A and 8B connected to the DC power source 7. A capacitor 26 for smoothing is further connected between the pair of power supply lines 8A and 8B.

The bridge circuits 20u, 20v, 20w (hereinafter often referred to generally as "bridge circuit(s) 20uvw") are respectively constituted by series circuits each including an upper arm switching device 21u, 21v, 21w (hereinafter often referred to generally as "upper arm switching device(s) 21uvw") and a lower arm switching device 22u, 22v, 22w (hereinafter often referred to generally as "lower arm switching device(s) 22uvw") connected in series. In the bridge circuits 20uvw, the current lines 9uvw for connection to the corresponding windings 5uvw of the AC motor M are respectively connected to midpoints 23u, 23v, 23w between the upper arm switching devices 21uvw and the lower arm switching devices 22uvw.

The switching devices 21uvw, 22uvw are typically power MOS transistors, and respectively incorporate parasitic diodes 24u, 24v, 24w; 25u, 25v, 25w each connected in a direction opposite to that of the DC power source 7.

The current derivative detectors 4uvw are configured so as to detect the current derivatives dIuvw which are the time-differential values of the line currents Iuvw flowing through the respective phase current lines 9uvw.

The PWM control signals supplied from the controller 1 are inputted to the gates of the switching devices 21uvw, 22uvw, whereby the switching devices 21uvw, 22uvw are turned on and off. The bridge circuits 20uvw are each controlled so that, when one of the upper arm switching device 21uvw and the lower arm switching device 22uvw thereof provided in pair is on, the other is off. The value of the PWM control signal is defined as "1" for a control state such that the upper arm switching device 21uvw is on and the lower arm switching device 22uvw is off, and the value of the PWM control signal is defined as "0" for a control state such that the upper arm switching device 21uvw is off and the lower arm switching device 22uvw is on. Then, the PWM control signals can describe any of 8 patterns (states) each expressed by a three-dimensional vector. The eight patterns (states) are expressed by (1,0,0), (1,1,0), (0,1,0), (0,1,1), (0,0,1), (1,0,1), (0,0,0) and (1,1,1). Of these, the first six patterns (1,0,0), (1,1,0), (0,1,0), (0,1,1), (0,0,1) and (1,0,1) correspond to states in which a voltage is applied across the windings 5uvw of the AC motor M. The other two patterns (0,0,0) and (1,1,1) correspond to states in which no voltage is applied across the windings 5uvw.

Figures 4A, 4B:
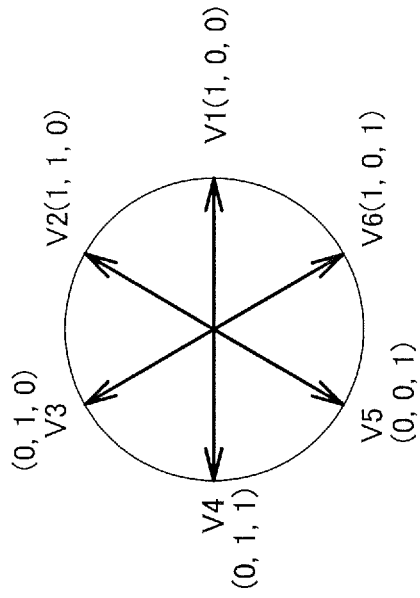
FIGS. 4A and 4B show voltage vectors corresponding to eight states of the inverter.

FIG. 4A shows voltage vectors V0 to V7 corresponding to the eight patterns (states) described above. The voltage vectors V1(1,0,0), V2(1,1,0), V3(0,1,0), V4(0,1,1), V5(0,0,1) and V6(1,0,1) corresponding to the six patterns for which the voltage is applied across the windings can be expressed by six voltage vectors that divide an electrical angle range of 360 degrees into six equiangular ranges as shown in FIG. 4B. The voltage vectors V0(0,0,0) and V7(1,1,1) are zero-voltage vectors for which no voltage is applied across the windings 5uvw.

Hereinafter, punctuation marks (commas) that delimit the components of the vectors may be omitted for simplification of the description of the vectors. In the following description, an expression "a voltage vector is applied" or the like means that the inverter 2 is controlled in a state expressed by the voltage vector and a voltage corresponding to the voltage vector is applied to the AC motor M.

Figure 5:
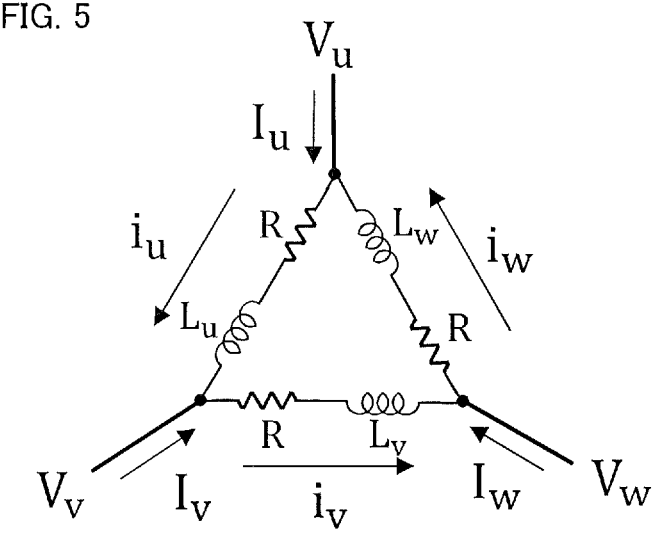
FIG. 5 is an electric circuit diagram of an AC motor model showing a three-phase motor model of Δ-connection.

FIG. 5 is an electric circuit diagram showing a model of the AC motor M, particularly showing a three-phase motor model of Δ-connection. A voltage equation for this model is represented by the following expression (1):

$$\begin{pmatrix} V_u - V_v \\ V_v - V_w \\ V_w - V_u \end{pmatrix} - R \begin{pmatrix} i_u \\ i_v \\ i_w \end{pmatrix} = \begin{pmatrix} L_u & M_{uv} & M_{wu} \\ M_{uv} & L_v & M_{vw} \\ M_{wu} & M_{vw} & L_w \end{pmatrix} \frac{d}{dt} \begin{pmatrix} i_u \\ i_v \\ i_w \end{pmatrix} \quad (1)$$

$V_{u,v,w}$: Terminal voltages
$I_{u,v,w}$: Line currents
$i_{u,v,w}$: Phase currents
R: Phase resistances
$L_{u,v,w}$: Phase self-inductances
$M_{uv,vw,wu}$: Inter-phase mutual inductances It is herein assumed that, when the motor rotation speed is sufficiently low, the term of an induced voltage is ignorable, and a change in inductance with time is sufficiently smaller than a change in current with time and, therefore, the term of a time-differentiated inductance is ignorable. As will be described below, an inductance matrix on a UVW coordinate system is defined as Muvw, and its inverse matrix M⁻¹uvw is determined. With the use of the inverse matrix M⁻¹uvw, the phase current derivatives are represented by the following expression (2):

$$\frac{d}{dt}\begin{pmatrix} i_u \\ i_v \\ i_w \end{pmatrix} = M_{uvw}^{-1}\left(\begin{pmatrix} V_u - V_v \\ V_v - V_w \\ V_w - V_u \end{pmatrix} - R\begin{pmatrix} i_u \\ i_v \\ i_w \end{pmatrix}\right) \quad (2)$$

$$M_{uvw} = \begin{pmatrix} L_u & M_{uv} & M_{wu} \\ M_{uv} & L_v & M_{vw} \\ M_{wu} & M_{vw} & L_w \end{pmatrix}$$

$$M_{uvw}^{-1} = \frac{1}{S}\begin{pmatrix} L_vL_w - M_{vw}^2 & -L_wM_{uv} + M_{vw}M_{wu} & -L_vM_{wu} + M_{uv}M_{vw} \\ -L_wM_{uv} + M_{vw}M_{wu} & L_uL_w - M_{wu}^2 & -L_uM_{vw} + M_{uv}M_{wu} \\ -L_vM_{wu} + M_{uv}M_{vw} & -LuM_{vw} + M_{uv}M_{wu} & L_uL_v - M_{uv}^2 \end{pmatrix}$$

$$S = L_uL_vL_w + 2M_{uv}M_{vw}M_{wu} - L_uM_{vw}^2 - L_vM_{wu}^2 - L_wM_{uv}^2$$

In the case of the motor of the Δ-connection, as described above, the line currents Iuvw are detectable. A relationship between the line currents Iuvw and the phase currents iuvw of the respective phase windings, and a relationship between time-differentiated line currents and time-differentiated phase currents are represented by the following expression (3):

$$\begin{pmatrix} I_u \\ I_v \\ I_w \end{pmatrix} = \begin{pmatrix} i_u - i_w \\ i_v - i_u \\ i_w - i_v \end{pmatrix} \quad \frac{d}{dt}\begin{pmatrix} I_u \\ I_v \\ I_w \end{pmatrix} = \frac{d}{dt}\begin{pmatrix} i_u - i_w \\ i_v - i_u \\ i_w - i_v \end{pmatrix} \quad (3)$$

The above expression (2) is rearranged with this expression, and the differential values of the line currents Iuvw with time t when the voltage vectors V1(100), V3(010), V5(001) are applied are represented by the following expression (4). However, a term that represents voltage drops due to the electrical resistances R of the respective windings 5uvw (phase resistances) (the second term in the expression (2)) are herein ignored, because the voltage drops have values substantially equal to those of the line current derivatives detected during the application of the voltage vector (000) or (111) and can be virtually cancelled by subtraction of the values of the line current derivatives. More specifically, where three-phase position estimation signals Us, Vs, Ws to be described below are defined based on the line current derivatives, the term related to the voltage drops due to the winding resistances R can be omitted. Therefore, the line current derivatives determined with the term of the voltage drops preliminarily omitted are shown for ease of description.

$$\begin{cases} \frac{d}{dt}\begin{pmatrix} I_u \\ I_v \\ I_w \end{pmatrix}_{100} = \frac{V_u}{S}\begin{pmatrix} L_v(L_u + L_w + 2M_{wu}) - (M_{uv} + M_{vw})^2 \\ -L_v(L_w + M_{wu}) - L_wM_{uv} + \\ M_{vw}(L_u + M_{uv} + M_{vw}) - (M_{uv} - M_{vw})M_{wu} \\ -L_u(L_v + M_{vw}) + M_{uv}(L_w + M_{uv} + M_{vw}) - \\ (L_v - M_{uv} + M_{vw})M_{wu} \end{pmatrix} \\ \frac{d}{dt}\begin{pmatrix} I_u \\ I_v \\ I_w \end{pmatrix}_{010} = \frac{V_v}{S}\begin{pmatrix} -L_v(L_w + M_{wu}) - L_wM_{uv} + \\ M_{vw}(L_u + M_{uv} + M_{vw}) - (M_{uv} - M_{vw})M_{wu} \\ L_w(L_u + L_v + 2M_{uv}) - (M_{vw} + M_{wu})^2 \\ -(L_u + M_{uv})(L_w + M_{vw}) + \\ (L_v + M_{uv} + M_{vw})M_{wu} + M_{wu}^2 \end{pmatrix} \\ \frac{d}{dt}\begin{pmatrix} I_u \\ I_v \\ I_w \end{pmatrix}_{001} = \frac{V_w}{S}\begin{pmatrix} -L_u(L_v + M_{vw}) + M_{uv}(L_w + M_{uv} + M_{vw}) - \\ (L_v - M_{uv} + M_{vw})M_{wu} \\ -(Lu + M_{uv})(L_w + M_{vw}) + \\ (L_v + M_{uv} + M_{vw})M_{wu} + M_{wu}^2 \\ L_u(L_v + L_w + 2M_{vw}) - (M_{uv} + M_{wu})^2 \end{pmatrix} \end{cases} \quad (4)$$

Where the three-phase position estimation signals Us, Vs, Ws are generated by using the current derivatives obtained when the three voltage vectors V1(100), V3(010), V5(001) are applied, the three-phase position estimation signals Us, Vs, Ws are defined by the following expression (5). In the expression (5), gu, gv, gw are the current derivative detection gains of the respective line currents. In the expression (5), the three-phase position estimation signals Us, Vs, Ws are each defined by factoring out the phase gain gu, gv, gw from a difference between current derivatives of the same phase.

$$\begin{pmatrix} Us \\ Vs \\ Ws \end{pmatrix} = \begin{pmatrix} g_u\left(\frac{d}{dt}Iu_{001} - \frac{d}{dt}Iu_{010}\right) \\ g_v\left(\frac{d}{dt}Iv_{100} - \frac{d}{dt}Iv_{001}\right) \\ g_w\left(\frac{d}{dt}Iw_{010} - \frac{d}{dt}Iw_{100}\right) \end{pmatrix} \quad (5)$$

The PWM voltages Vu, Vv, Vw for the three phases (terminal voltages to be applied to the respective phases when the upper arm switching devices are on) are virtually equal to each other and, therefore, V=Vu=Vv=Vw in the expression (4). With the expression (4) put in the expression (5), the three-phase position estimation signals are represented by the following cyclic symmetric polynomial expression (6). The three-phase position estimation signals are defined so that the three phases are equivalently influenced even if the inductances fluctuate due to the magnetic saturation of the motor when a higher torque occurs. Therefore, the position detection error is suppressed.

$$\begin{pmatrix} Us \\ Vs \\ Ws \end{pmatrix} = \frac{V}{S}\begin{pmatrix} g_u(L_wL_v - L_vL_u + \\ 2(L_wM_{uv} - L_uM_{vw} + M_{wu}M_{uv} - M_{vw}M_{wu}) + M_{uv}^2 - M_{vw}^2) \\ g_v(L_uL_w - L_wL_v + \\ 2(L_uM_{vw} - L_vM_{wu} + M_{uv}M_{vw} - M_{wu}M_{uv}) + M_{vw}^2 - M_{wu}^2) \\ g_w(L_vL_u - L_uL_w + \\ 2(L_vM_{wu} - L_wM_{uv} + M_{vw}M_{wu} - M_{uv}M_{vw}) + M_{wu}^2 - M_{uv}^2) \end{pmatrix} \quad (6)$$

Further, where the current derivative detectors 4uvw are configured to detect the current derivatives at a higher sensitivity with the use of current transformers or the like having magnetic cores, the gains are liable to fluctuate due to the saturation of the magnetic cores of the current transformers when a higher torque occurs to increase the motor current. However, the three-phase position estimation signals are each defined as described above with the use of a difference between current derivative signals of the same phase, so that the gains can be factored out. This makes it possible to suppress the position estimation error which may otherwise occur due to the magnetic saturation of the current derivative detectors 4uvw when a greater current is supplied.

The three voltage vectors for the position detection are not limited to V1(100), V3 (010) and V5(001). Where three voltage vectors V2(011), V6(101) and V4(110) are used, the three-phase position estimation signals can be derived in the same manner.

The three-phase position estimation signals may be generated with the use of two voltage vectors. Specifically, where the current derivatives obtained when two voltage vectors V1(001), V3(010) are applied are used, for example, the three-phase position estimation signals can be defined by the following expression (7). Where the current derivative detection gains for the respective phases are different from each other, the three-phase position estimation signals are represented by the expression (8). Where the current derivative detection gains are equal to each other (g=gu=gv=gw), the three-phase position estimation signals are represented by the expression (9), which is equivalent to that obtained when the detection gains are all the same in the expression (6).

$$\begin{pmatrix} Us \\ Vs \\ Ws \end{pmatrix} = \begin{pmatrix} g_u\frac{d}{dt}Iu_{001} - g_u\frac{d}{dt}Iu_{010} \\ g_u\frac{d}{dt}Iu_{010} - g_v\frac{d}{dt}Iv_{001} \\ g_w\frac{d}{dt}Iw_{010} - g_u\frac{d}{dt}Iu_{001} \end{pmatrix} \quad (7)$$

-continued $$\begin{pmatrix} Us \\ Vs \\ Ws \end{pmatrix} = \tag{8}$$

$$\frac{V}{S} \begin{pmatrix} g_u(L_wL_v - L_vL_u + \\ 2(L_wM_{uv} - L_uM_{vw} + M_{wu}M_{uv} - M_{vw}M_{wu}) + M_w^2 - M_{vw}^2) \\ g_vL_uL_w - g_LL_wL_v + (g_u + g_w)(L_uM_{vw} - L_vM_{wu} + M_{uv}M_{vw} - \\ M_{wu}M_{uv}) + (g_v - g_u)(L_wM_{uv} - M_{vw}M_{wu}) + g_uM_{vw}^2 - g_vM_{wu}^2 \\ g_uL_vL_u - g_wL_uL_w + (g_u + g_w)(L_vM_{wu} - L_wM_{uv} + M_{vw}M_{wu} - \\ M_{uv}M_{vw}) + (g_u - g_w)(L_uM_{vw} - M_{uv}M_{wu}) + g_wM_{wu}^2 - g_uM_{uv}^2 \end{pmatrix}$$

$$\begin{pmatrix} Us \\ Vs \\ Ws \end{pmatrix} = \frac{gV}{S} \begin{pmatrix} L_wL_v - L_vL_u + 2(L_wM_{uv} - L_uM_{vw} + M_{wu}M_{uv} - \\ M_{vw}M_{wu}) + M_{uv}^2 - M_{vw}^2 \\ L_uL_w - L_wL_v + 2(L_uM_{vw} - L_vM_{wu} + M_{uv}M_{vw} - \\ M_{wu}M_{uv}) + M_{vw}^2 - M_{wu}^2 \\ L_vL_u - L_uL_w + 2(L_vM_{wu} - L_wM_{uv} + M_{vw}M_{wu} - \\ M_{uv}M_{vw}) + M_{wu}^2 - M_{uv}^2 \end{pmatrix} \tag{9}$$

Where the current derivatives obtained when the two voltage vectors are applied are used, it is necessary to generate three-phase position estimation signals for two of the three phases by subtraction of a different phase signal, making it impossible to factor out the gains of the current derivative detectors 4*uvw*. Therefore, where the current derivative detectors 4*uvw* (the current transformers or the like) are configured so that the magnetic bodies thereof are saturated by the application of a higher current to thereby reduce the gains, it is difficult to utilize this procedure. Where the gains of the current derivative detectors 4*uvw* for the respective phases are all the same and are free from fluctuation according to the current value, in contrast, this procedure is effective and advantageous in that the position detection responsiveness is improved by reducing the number of the voltage vectors to be applied for the position detection. As obvious from the above expression (4), relationships represented by the following expression (10) are established. Therefore, by replacement of the terms, the three-phase position estimation signals can be defined in the same manner based on current derivatives obtained when other two voltage vectors are applied.

$$\frac{d}{dt}Iv_{100} = \frac{d}{dt}Iu_{010} \quad \frac{d}{dt}Iw_{010} = \frac{d}{dt}Iv_{001} \quad \frac{d}{dt}Iu_{001} = \frac{d}{dt}Iw_{100} \tag{10}$$

In any case, where the two voltage vectors are used for the position detection, it is necessary to generate a three-phase position estimation signal for any of the three phases based on a difference between current derivatives of different phases. Therefore, the three-phase position estimation signals are influenced by the gains of the current derivative detectors 4*uvw*.

The current derivatives of only two of the three phases may be detected, and the current derivative of the remaining one phase may be computed by utilizing a relationship such that the sum of the currents for all the phases is zero.

The estimated rotor position can be determined as represented by the following expression (11) by transforming the three-phase position estimation signals thus determined into two-phase signals and calculating an arc tangent.

$$\begin{pmatrix} \alpha s \\ \beta s \end{pmatrix} = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} Us \\ Vs \\ Ws \end{pmatrix} \quad \theta = \text{ArcTan}\left(\frac{\beta s}{\alpha s}\right) \tag{11}$$

Self-inductances Lu, Lv, Lw standardized for the respective phases are represented by the following expression (12) by using a motor electrical angle θ and a standardized inductance amplitude α. It is herein assumed that the motor is the surface magnet type motor and mutual inductances are small. The self-inductances Lu, Lv, Lw are each standardized with an inductance offset L0. The offset L0 is represented by L0=(Ld+Lq)/2 based on inductances Ld, Lq on the dq rotational coordinate system, and an inductance amplitude L1 for each phase is represented by L1=(Ld−Lq)/2. The standardized inductance amplitude α can be represented by α=L1/L0, which is the ratio of the inductance amplitude L1 to the offset L0.

$$\begin{pmatrix} Lu \\ Lv \\ Lw \end{pmatrix} = \begin{pmatrix} 1 + \alpha \sin\{2(\theta + \frac{2\pi}{3})\} \\ 1 + \alpha \sin(2\theta) \\ 1 + \alpha \sin\{2(\theta + \frac{\pi}{3})\} \end{pmatrix} \tag{12}$$

The three-phase position estimation signals calculated from the above expression (6) with the use of the three voltage vectors are represented by the following expression (13). Where α<<1 and the term of the second or higher power of α is ignored, the expression (13) is approximated to the following expression (14). Thus, the three-phase position estimation signals are provided as three-phase sinusoidal signals.

Thus, the estimated position is determined, which has two fluctuation cycles per each electrical angle cycle. Where two voltage vectors are used, the estimated position fluctuates in the same manner.

$$\begin{pmatrix} Us \\ Vs \\ Ws \end{pmatrix} = \tag{13}$$

$$\frac{4\sqrt{3}}{4 - 3\alpha^2 - \alpha^3 \sin(6\theta)} \begin{pmatrix} g_u \sin(2\theta)\left(\alpha + \alpha^2 \sin\{2(\theta + \frac{3\pi}{4})\}\right) \\ g_v \sin\left(2\theta + \frac{\pi}{3}\right)\left(\alpha + \alpha^2 \sin\{2(\theta + \frac{\pi}{12})\}\right) \\ g_w \sin\left(2\theta + \frac{2\pi}{3}\right)\left(\alpha + \alpha^2 \sin\{2(\theta + \frac{5\pi}{12})\}\right) \end{pmatrix}$$

$$\begin{pmatrix} Us \\ Vs \\ Ws \end{pmatrix} = \sqrt{3}\alpha \begin{pmatrix} g_u \sin(2\theta) \\ g_v \sin\{2(\theta + \frac{\pi}{3})\} \\ g_w \sin\{2(\theta + \frac{2\pi}{3})\} \end{pmatrix} \tag{14}$$

Figure 6:
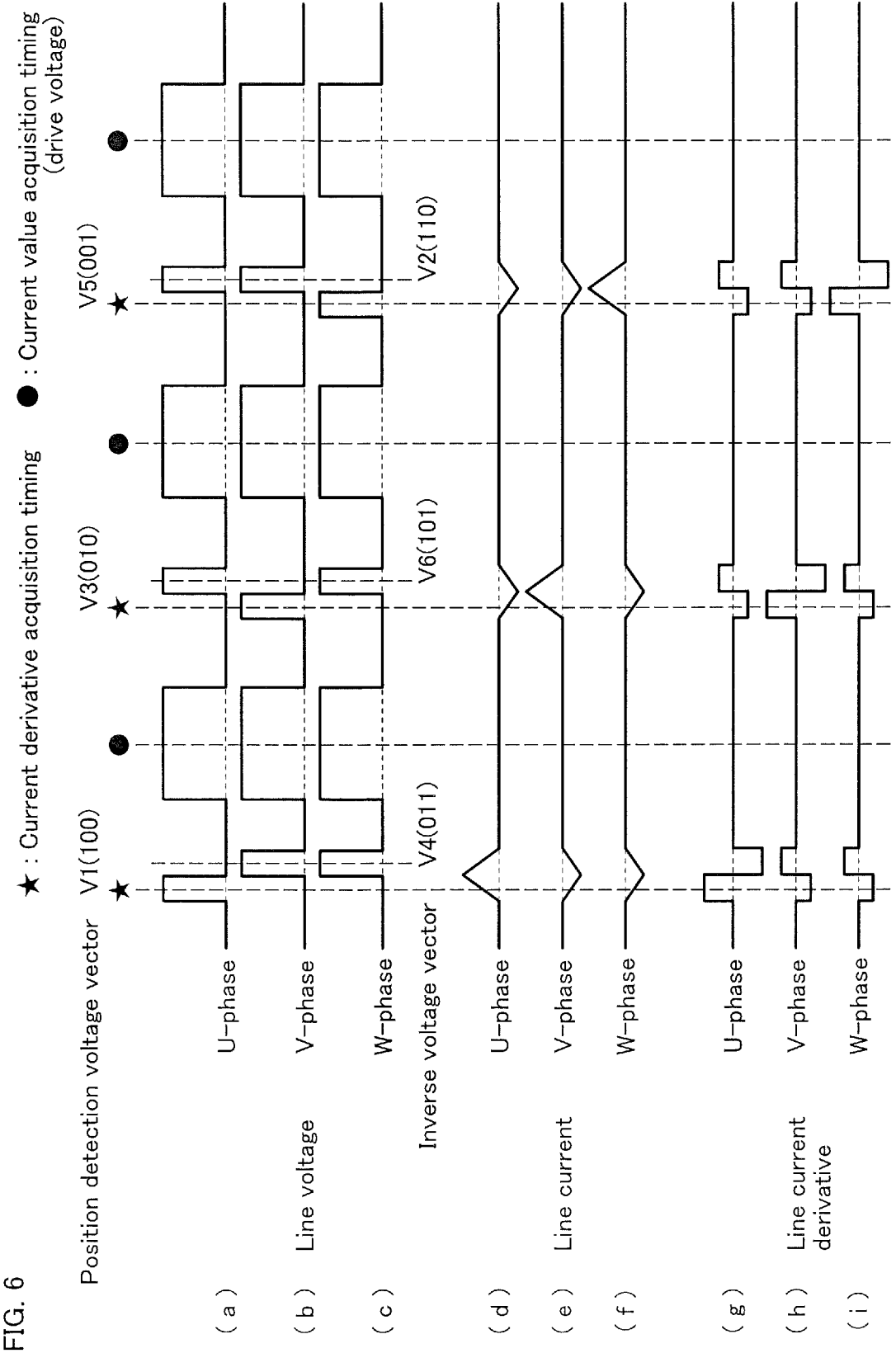
FIG. 6 is a waveform diagram showing the waveforms of voltages, currents and current derivatives observed when the AC motor M is rotated at a lower rotation speed (including a halt state) by way of example.

FIG. 6 is a waveform diagram showing voltages, currents and current derivatives observed when the AC motor M is rotated at a lower rotation speed (or in a halt state) by way of example. In FIG. 6, (a) shows the waveform of a U-phase line voltage applied to the U-phase current line 9*u*, (b) shows the waveform of a V-phase line voltage applied to the V-phase current line 9*v*, and (c) shows the waveform of a W-phase line voltage applied to the W-phase current line 9*w*. Further, in FIG. 6, (d), (e) and (f) respectively show changes in the U-phase line current Iu, the V-phase line current Iv and the W-phase line current Iw outputted by the current detectors 3uvw. In FIG. 6, (g), (h) and (i) respectively show changes in the time-differential values of the U-phase, V-phase and W-phase line currents, i.e., the U-phase current derivative dIu, the V-phase current derivative dIv and the W-phase current derivative dIw, which respectively correspond to the outputs of the current derivative detectors 4uvw.

As shown in FIG. 3, the inverter 2 is a three-phase inverter including the six switching devices 21uvw, 22uvw, and three terminals connected to the U-phase, V-phase and W-phase windings 5uvw of the AC motor M are connected to either a power supply voltage Vdc (PWM voltage) or a ground potential (0 V). As described above, the state in which the winding 5uvw is connected to the power supply voltage Vdc (i.e., the upper arm switching device 21uvw is on) is represented as "1" and the state in which the winding 5uvw is connected to 0 V (i.e., the upper arm switching device 21uvw is off) is represented by "0." Then, as shown in FIG. 4A, the voltage vectors to be generated include the eight voltage vectors V0(0,0,0) to V7(1,1,1). Of these, the voltage vectors V0(0,0,0) and V7(1,1,1) are zero-voltage vectors for which the voltage applied across the windings 5uvw is zero with all the winding terminals at the same potential. The other six voltage vectors V1 to V6 are non-zero voltage vectors for which a voltage is applied across the windings 5uvw.

The PWM generator 14 generates PWM control signals to turn on and off the switching devices 21uvw, 22uvw of the inverter 2 by comparing the respective phase voltage commands V*uvw* outputted from the current controller 13 with a triangular carrier signal. For example, a frequency for the PWM (the frequency of the triangular carrier signal) is 14 kHz, which corresponds to a cycle of about 70 psec. When the motor rotation speed is low, the phase voltage commands Vuvw are low, so that the periods of the zero-voltage vectors V0, V7 during which no voltage is applied across the windings 5uvw are prolonged. FIG. 6 shows waveforms observed when the period T0 of the zero-voltage vector V0 and the period T7 of the zero-voltage vector V7 are each set to about one half the cycle of the PWM and the AC motor M is stopped.

The PWM generator 14 has the function of applying the voltage vectors V1, V3, V5 for the detection of the rotor position (position detection voltage vectors) during the period of the zero voltage vector V0 or V7 in addition to the function of generating the PWM control signals. A period during which the position detection voltage vectors are each applied is sufficiently shorter than the PWM cycle (e.g., about 70 μsec) and sufficiently shorter than one half the PWM cycle. More specifically, the position detection voltage vector application period is preferably not greater than 10% of the PWM cycle, more preferably not greater than 5% of the PWM cycle.

In order to minimize the influence of the application of the position detection voltage vectors V1, V3, V5, it is preferred to apply inverse voltage vectors V4(011), V6(101), V2(110) obtained by inverting the position detection voltage vectors V1, V3, V5 for periods equivalent to those of the position detection voltage vectors immediately after the application of the position detection voltage vectors to thereby offset the currents occurring due to the position detection voltage vectors.

The position detection voltage vectors V1, V3, V5, and the inverse voltage vectors V4, V6, V2 for the offset of the position detection voltage vectors V1, V3, V5 are applied in the order of the U-phase, the V-phase and the W-phase in each PWM cycle. Thus, the influence of the application of the position detection voltage vectors can be equalized among the three phases.

As indicated by (d), (e), (f) in FIG. 6 and by (g), (h), (i) in FIG. 6, the U-phase, V-phase and W-phase currents change, and the U-phase, V-phase and W-phase current derivative detection voltages change according to the application of the position detection voltage vectors and the inverse voltage vectors. The current derivatives are detected directly by the current derivative detectors such as the current transformers, whereby the current derivative detection voltages of the respective phases change instantaneously upon the application of the position detection voltage vectors. Therefore, the current derivatives can be each detected substantially during the position detection voltage vector application period (e.g., 3 μsec). Timings corresponding to the application of the position detection voltage vectors are current derivative acquisition timings (each indicated by a symbol ★) at which the current derivatives are to be sampled. The current values of the respective phases are each determined by sampling the output of the current detector 3uvw at a current value acquisition timing (indicated by a symbol) during the voltage vector application period for the motor driving.

The current derivatives thus detected are put in the expression (5), whereby the three-phase position estimation signals Us, Vs, Ws can be provided. Further, the motor electrical angle θ can be computed from the expression (11). The computation is performed by the rotor angle computer 151 (see FIG. 2). Where two voltage vectors are used, the three-phase position estimation signals Us, Vs, Ws can be computed from the expression (7) instead of the expression (5).

Where the term attributable to the voltage drops due to the winding resistances (the second term in the expression (2)) is to be cancelled, current derivatives may also be acquired for the state corresponding to the voltage vector V7(111) or V0(000), and subtracted from the current derivatives acquired when the position detection voltage vectors V1(100), V3(010), V5(001) are applied.

Figure 7:
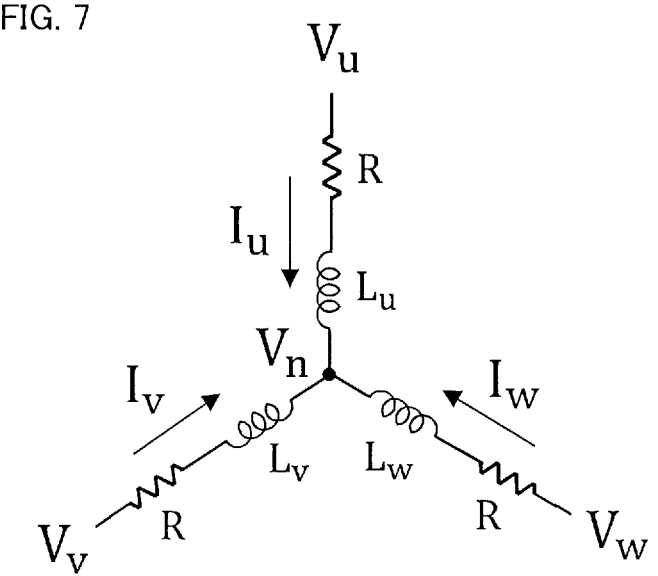
FIG. 7 is an electric circuit diagram of an AC motor model showing a three-phase motor model of Y-connection.

The expansion of the expressions described above is based on the Δ-connection model shown in FIG. 5. In the case of the Y-connection model, expression expansion is provided in substantially the same manner to be described below. A voltage equation for a model shown in FIG. 7 is represented by the following expression (15) with the use of a midpoint potential Vn.

$$\begin{pmatrix} V_u - V_n \\ V_v - V_n \\ V_w - V_n \end{pmatrix} - R \begin{pmatrix} I_u \\ I_v \\ I_w \end{pmatrix} = \begin{pmatrix} L_u & M_{uv} & M_{wu} \\ M_{uv} & L_v & M_{vw} \\ M_{wu} & M_{vw} & L_w \end{pmatrix} \frac{d}{dt} \begin{pmatrix} I_u \\ I_v \\ I_w \end{pmatrix} \quad (15)$$

The current derivatives are represented by the following expression (16) by using the inverse matrix of the inductance matrix as in the expression (2).

$$\frac{d}{dt}\begin{pmatrix} I_u \\ I_v \\ I_w \end{pmatrix} = M_{uvw}^{-1} \left( \begin{pmatrix} V_u - V_n \\ V_v - V_n \\ V_w - V_n \end{pmatrix} - R\begin{pmatrix} I_u \\ I_v \\ I_w \end{pmatrix} \right) \quad (16)$$

The differential values of the line currents (which are equal to the phase currents in the case of the Y-connection model) obtained when the position detection voltage vectors V1(100), V3(010), V5(001) are applied are represented by the following expression (17) as derived in the same manner as the expression (4).

$$\begin{cases} \dfrac{d}{dt}\begin{pmatrix} I_u \\ I_v \\ I_w \end{pmatrix}_{100} = M_{uvw}^{-1}\begin{pmatrix} V_u - V_n \\ -V_n \\ -V_n \end{pmatrix} \\ \dfrac{d}{dt}\begin{pmatrix} I_u \\ I_v \\ I_w \end{pmatrix}_{010} = M_{uvw}^{-1}\begin{pmatrix} -V_n \\ V_v - V_n \\ -V_n \end{pmatrix} \\ \dfrac{d}{dt}\begin{pmatrix} I_u \\ I_v \\ I_w \end{pmatrix}_{001} = M_{uvw}^{-1}\begin{pmatrix} -V_n \\ -V_n \\ V_w - V_n \end{pmatrix} \end{cases} \quad (17)$$

Here, the expression (16) is solved for the midpoint potential Vn with the use of the following expression (18). Then, the solution is represented by the following expression (19):

$$I_u + I_v + I_w = 0 \Rightarrow \frac{d}{dt}(I_u + I_v + I_w) = 0 \quad (18)$$

$$\begin{cases} V_n = \dfrac{A_u V_u + A_v V_v + A_w V_w}{k} \\[4pt] \begin{bmatrix} A_u = L_v(L_w - M_{wu}) - L_w M_{uv} + M_{vw}(M_{wu} + M_{uv}) - M_{vw}^2 \\ A_v = L_w(L_u - M_{uv}) - L_u M_{vw} + M_{wu}(M_{uv} + M_{vw}) - M_{wu}^2 \\ A_w = L_u(L_v - M_{vw}) - L_v M_{wu} + M_{uv}(M_{vw} + M_{wu}) - M_{uv}^2 \\ k = (L_u L_v + L_v L_w + L_w L_u) - 2(L_u M_{vw} + L_v M_{wu} + L_w M_{uv}) + \\ \qquad 2(M_{uv} M_{vw} + M_{vw} M_{wu} + M_{uv} M_{wu}) \end{bmatrix} \end{cases} \quad (19)$$

Where the three-phase position estimation signals are each defined by a difference between current derivatives of the same phase as in the expression (5), the following expression (20) is provided, which is a cyclic symmetric polynomial with the gains of the current derivatives factored out as in the expression (6). Therefore, even if the inductances fluctuate due to the magnetic saturation of the motor when a higher torque occurs, the three phases are equivalently influenced by the fluctuation of the inductances in the Y-connection model as in the Δ-connection model. Thus, the position detection error is suppressed. Where the position detection voltage vectors V4(011), V6(101), V2(110) are used, the same result can be provided. Where two position detection voltage vectors are used, the Y-connection model is influenced by the gains of the current derivative detectors 4uvw as in the case of the Δ-connection model.

$$\begin{pmatrix} Us \\ Vs \\ Ws \end{pmatrix} = \frac{V}{S}\begin{pmatrix} g_u\!\left(M_{uv}(L_w + M_{vw}) - M_{wu}(L_v + M_{vw}) + \dfrac{A_u}{k}(A_v - A_w)\right) \\ g_v\!\left(M_{vw}(L_u + M_{wu}) - M_{uv}(L_w + M_{wu}) + \dfrac{A_v}{k}(A_w - A_u)\right) \\ g_w\!\left(M_{wu}(L_v + L_{uv}) - M_{vw}(L_u + M_{uv}) + \dfrac{A_w}{k}(A_u - A_v)\right) \end{pmatrix} \quad (20)$$

When the UVW fixed coordinate system is shifted to the αβ fixed coordinate system and to the dq rotational coordinate system, the inductance matrix is transformed in the following manner.

A transformation matrix Tαβ and a general inverse matrix T$^+$αβ for the transformation from the UVW fixed coordinate system to the αβ fixed coordinate system are defined by the following expression (21):

$$T_{\alpha\beta} = \sqrt{\tfrac{2}{3}}\begin{pmatrix} 1 & -\tfrac{1}{2} & -\tfrac{1}{2} \\ 0 & \tfrac{\sqrt{3}}{2} & -\tfrac{\sqrt{3}}{2} \end{pmatrix} \quad T_{\alpha\beta}^{+} = \sqrt{\tfrac{2}{3}}\begin{pmatrix} 1 & 0 \\ -\tfrac{1}{2} & \tfrac{\sqrt{3}}{2} \\ -\tfrac{1}{2} & -\tfrac{\sqrt{3}}{2} \end{pmatrix} \quad (21)$$

Further, a transformation matrix Tdq and an inverse matrix T$^{-1}$dg for the transformation of the αβ fixed coordinate system to the dq rotational coordinate system are defined by the following expression (22):

$$T_{dq} = \begin{pmatrix} \cos(\theta) & \sin(\theta) \\ -\sin(\theta) & \cos(\theta) \end{pmatrix} \quad T_{dq}^{-1} = \begin{pmatrix} \cos(\theta) & -\sin(\theta) \\ \sin(\theta) & \cos(\theta) \end{pmatrix} \quad (22)$$

Products of the transformation matrixes and their inverse matrixes are represented by the following expression (23):

$$T_{\alpha\beta}^{+} T_{\alpha\beta} = \begin{pmatrix} 1 & 0 & 0 \\ 0 & 1 & 0 \\ 0 & 0 & 1 \end{pmatrix} + \frac{1}{3}\begin{pmatrix} 1 & 1 & 1 \\ 1 & 1 & 1 \\ 1 & 1 & 1 \end{pmatrix} \quad T_{dq}^{-1} T_{dq} = \begin{pmatrix} 1 & 0 \\ 0 & 1 \end{pmatrix} \quad (23)$$

A phase voltage equation on the UVW fixed coordinate system is represented by the following expression (24) by using a motor induced voltage e. The expression (24) is multiplied on its left side by the αβ transformation matrix Tαβ of the expression (21) to insert a unit matrix between the inductance matrix and the currents, whereby a voltage equation on the αβ fixed coordinate system can be defined as represented by the following expression (25):

$$\begin{pmatrix} v_u \\ v_v \\ v_w \end{pmatrix} = R\begin{pmatrix} i_u \\ i_v \\ i_w \end{pmatrix} + \frac{d}{dt}\left\{\begin{pmatrix} L_u & M_{uv} & M_{wu} \\ M_{uv} & L_v & M_{vw} \\ M_{wu} & M_{vw} & L_w \end{pmatrix}\begin{pmatrix} i_u \\ i_v \\ i_w \end{pmatrix}\right\} + \begin{pmatrix} e_u \\ e_v \\ e_w \end{pmatrix} \quad (24)$$

$$T_{\alpha\beta}\begin{pmatrix} v_u \\ v_v \\ v_w \end{pmatrix} = R T_{\alpha\beta}\begin{pmatrix} i_u \\ i_v \\ i_w \end{pmatrix} + \quad (25)$$

$$\frac{d}{dt}\left\{T_{\alpha\beta}\begin{pmatrix} L_u & M_{uv} & M_{wu} \\ M_{uv} & L_v & M_{vw} \\ M_{wu} & M_{vw} & L_w \end{pmatrix}\left(T_{\alpha\beta}^{+}T_{\alpha\beta} - \frac{1}{3}\begin{pmatrix} 1 & 1 & 1 \\ 1 & 1 & 1 \\ 1 & 1 & 1 \end{pmatrix}\right)\begin{pmatrix} i_u \\ i_v \\ i_w \end{pmatrix}\right\} +$$

$$T_{\alpha\beta}\begin{pmatrix} e_u \\ e_v \\ e_w \end{pmatrix} \Rightarrow \begin{pmatrix} v_\alpha \\ v_\beta \end{pmatrix} = R\begin{pmatrix} i_\alpha \\ i_\beta \end{pmatrix} + \frac{d}{dt}\left\{\begin{pmatrix} L_\alpha & M_{\alpha\beta} \\ M_{\beta\alpha} & L_\alpha \end{pmatrix}\begin{pmatrix} i_\alpha \\ i_\beta \end{pmatrix}\right\} + \begin{pmatrix} e_\alpha \\ e_\beta \end{pmatrix}$$

With iu+iv+iw=0, the following expression (26) is established, so that only the first term of the first expression in the expression (23) remains. Therefore, the product $T^+\alpha\beta \cdot T\alpha\beta$ of the $\alpha\beta$ transformation matrixes is a unit matrix. This is utilized here.

$$\begin{pmatrix} 1 & 1 & 1 \\ 1 & 1 & 1 \\ 1 & 1 & 1 \end{pmatrix} \begin{pmatrix} i_u \\ i_v \\ i_w \end{pmatrix} = \begin{pmatrix} 0 \\ 0 \\ 0 \end{pmatrix} \quad (26)$$

Similarly, the expression (25) which is the phase voltage equation on the $\alpha\beta$ fixed coordinate system is multiplied on its left side by the dq transformation matrix Tdq (expression (22)) to insert a unit matrix (see the second expression in the expression (23)), whereby a voltage equation on the dq rotational coordinate system is provided as represented by the following expression (27):

$$T_{dq}\begin{pmatrix} v_\alpha \\ v_\beta \end{pmatrix} = \quad (27)$$

$$T_{dq}\begin{pmatrix} i_\alpha \\ i_\beta \end{pmatrix} + \frac{d}{dt}\left\{T_{dq}\begin{pmatrix} L_\alpha & M_{\alpha\beta} \\ M_{\beta\alpha} & L_\alpha \end{pmatrix}T_{dq}^{-1}T_{dq}\begin{pmatrix} i_\alpha \\ i_\beta \end{pmatrix}\right\} + T_{dq}\begin{pmatrix} e_\alpha \\ e_\beta \end{pmatrix} \Rightarrow \begin{pmatrix} v_d \\ v_q \end{pmatrix} =$$

$$R\begin{pmatrix} i_d \\ i_q \end{pmatrix} + \frac{d}{dt}\left\{\begin{pmatrix} L_d & M_{dq} \\ M_{qd} & L_q \end{pmatrix}\begin{pmatrix} i_d \\ i_q \end{pmatrix}\right\} + \begin{pmatrix} e_d \\ e_q \end{pmatrix}$$

With the expressions (25) and (27) thus derived, inductance matrixes $M\alpha\beta$, Mdq on the respective coordinate systems can be defined as represented by the following expression (28):

$$M_{\alpha\beta}=T_{\alpha\beta}M_{uvw}T_{\alpha\beta}^+ \quad M_{dq}=T_{dq}M_{\alpha\beta}T_{dq}^{-1} \quad (28)$$

Here, components m, n, s are defined as represented by the following expression (29) containing inductance components on the UVW coordinate system:

$$\begin{cases} m = \dfrac{1}{6}(2L_u - L_v - L_w - 2(M_{uv} - M_{vw} + M_{wu})) \\ n = \dfrac{1}{2\sqrt{3}}(-L_v + L_w + 2(M_{uv} - M_{wu})) \\ s = \dfrac{1}{3}(L_u + L_v + L_w - M_{uv} - M_{vw} - M_{wu}) \end{cases} \quad (29)$$

The inductance matrixes on the respective coordinate systems are computed from the expression (28) and, with the use of m, n, s in the expression (29), inductances on the $\alpha\beta$ fixed coordinate system and on the dq rotational coordinate system are respectively represented by the following expressions (30) and (31):

$$\begin{pmatrix} L_\alpha & M_{\alpha\beta} \\ M_{\beta\alpha} & L_\alpha \end{pmatrix} = \begin{pmatrix} s & 0 \\ 0 & s \end{pmatrix} + \begin{pmatrix} m & n \\ n & -m \end{pmatrix} \quad (30)$$

$$\begin{pmatrix} L_d & M_{dq} \\ M_{qd} & L_q \end{pmatrix} = \begin{pmatrix} s & 0 \\ 0 & s \end{pmatrix} + \begin{pmatrix} m & n \\ n & -m \end{pmatrix}\begin{pmatrix} \cos(2\theta) & \sin(2\theta) \\ -\sin(2\theta) & \cos(2\theta) \end{pmatrix} \quad (31)$$

Further, the transformation of the inductances from the $\alpha\beta$ fixed coordinate system to the dq rotational coordinate system is represented by the following expression (32):

$$\begin{pmatrix} L_d - s & M_{dq} \\ M_{qd} & L_q - s \end{pmatrix} = \begin{pmatrix} L_\alpha - s & M_{\alpha\beta} \\ M_{\beta\alpha} & L_\alpha - s \end{pmatrix}\begin{pmatrix} \cos(2\theta) & -\sin(2\theta) \\ \sin(2\theta) & \cos(2\theta) \end{pmatrix} \quad (32)$$

Figure 8:
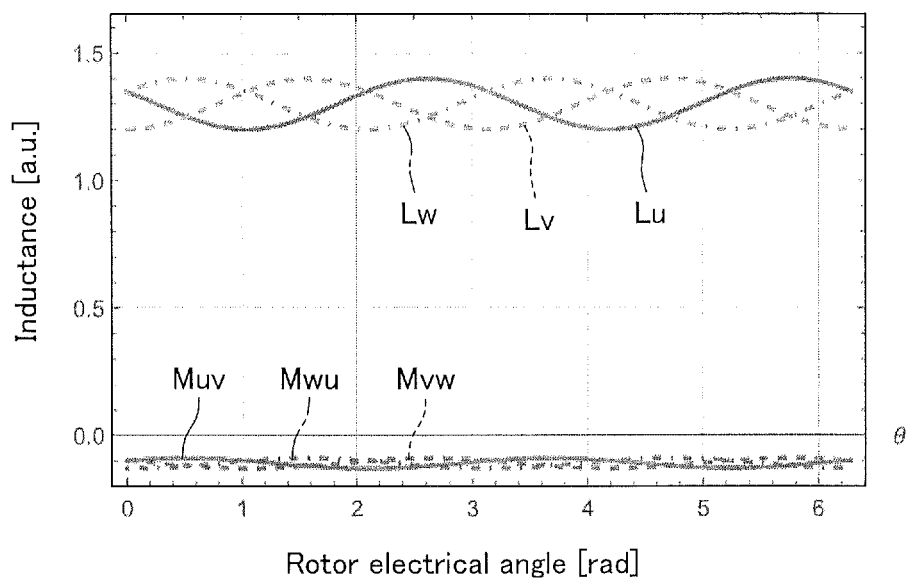
FIG. 8 shows ideal sinusoidal waveform inductances on a UVW fixed coordinate system by way of example.

FIG. 8 shows ideal sinusoidal waveform inductances on the UVW fixed coordinate system by way of example. In this example, it is assumed that self-inductances and mutual inductances have amplitudes of 0.1 and 0.02, respectively, and offsets of 1.3 and −0.11, respectively, and each have a sinusoidal waveform with a phase shift of 120 degrees.

Figure 9A:
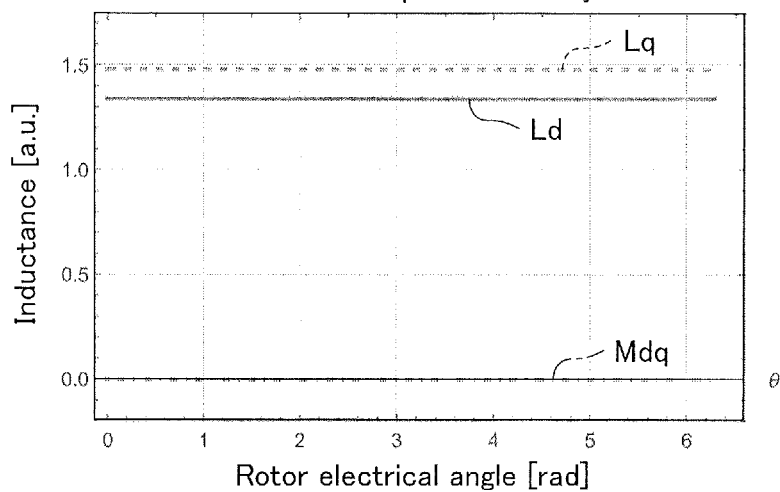
FIGS. 9A, 9B and 9C respectively show inductances Ld, Lq, Mdq on a dq rotational coordinate system, inductances Lα, Lβ, Mαβ on an αβ fixed coordinate system, and inductance components m, n, s calculated and plotted for the ideal sinusoidal waveform inductances by way of example.
Figure 9B:
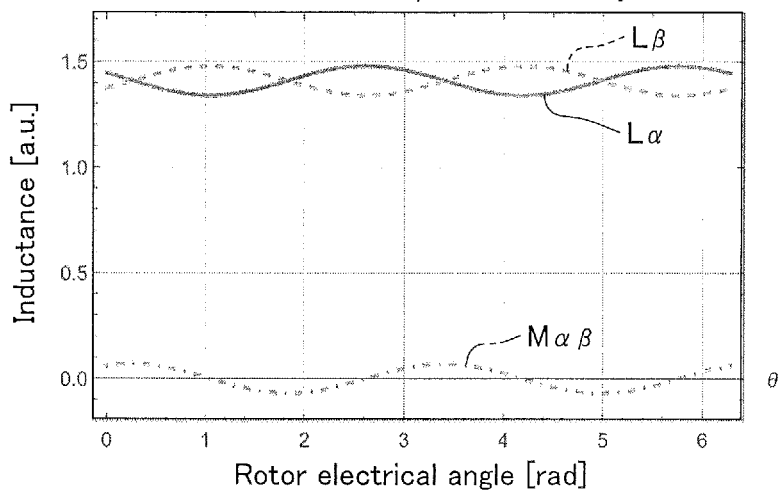
Figure 9C:
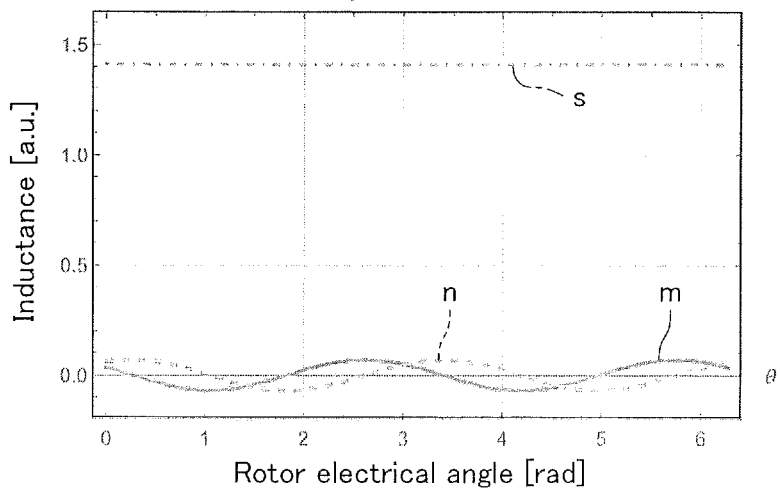

For the ideal sinusoidal waveform inductances, the inductances $L\alpha$, $L\beta$, $M\alpha\beta$ on the $\alpha\beta$ fixed coordinate system, the inductances Ld, Lq, Mdq on the dq rotational coordinate system, and the components m, n, s are computed by using the expressions (29), (30) and (31), and are plotted as shown in FIGS. 9A, 9B and 9C. As generally known, the inductances Ld, Lq on the dq rotational coordinate system are not dependent on the rotor position, and are Ld=1.48 and Lq=1.34, respectively, in this example. Further, the saliency ratio is Lq/Ld=1.10.

Figure 10A:
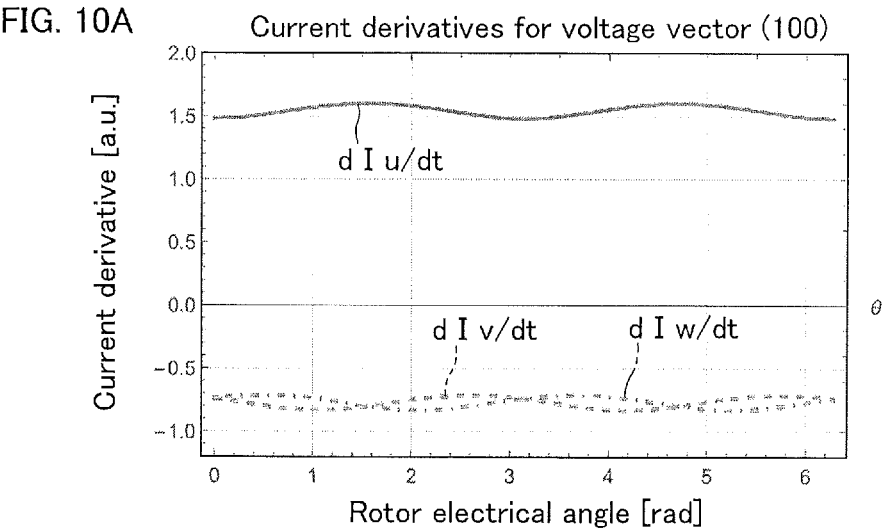
FIGS. 10A, 10B and 10C respectively show current derivatives to be obtained when three voltage vectors are applied as calculated based on the ideal sinusoidal waveform inductances by way of example.
Figure 10B:
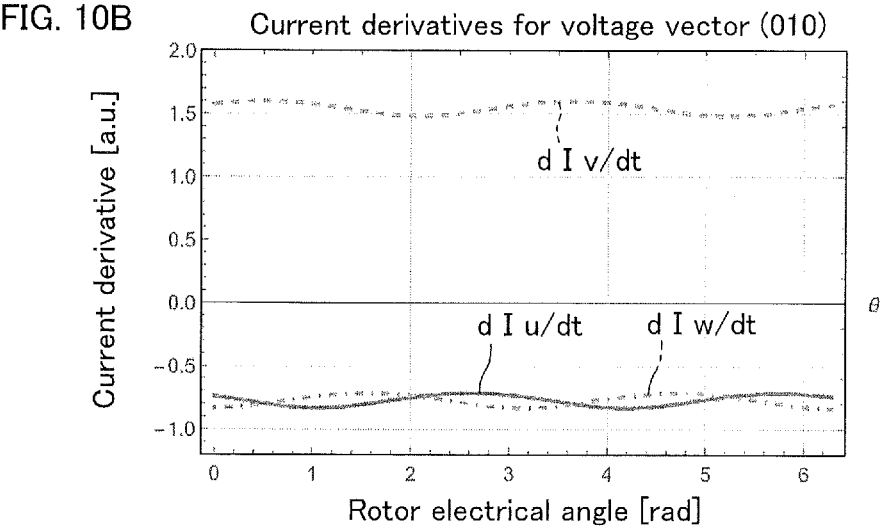
Figure 10C:
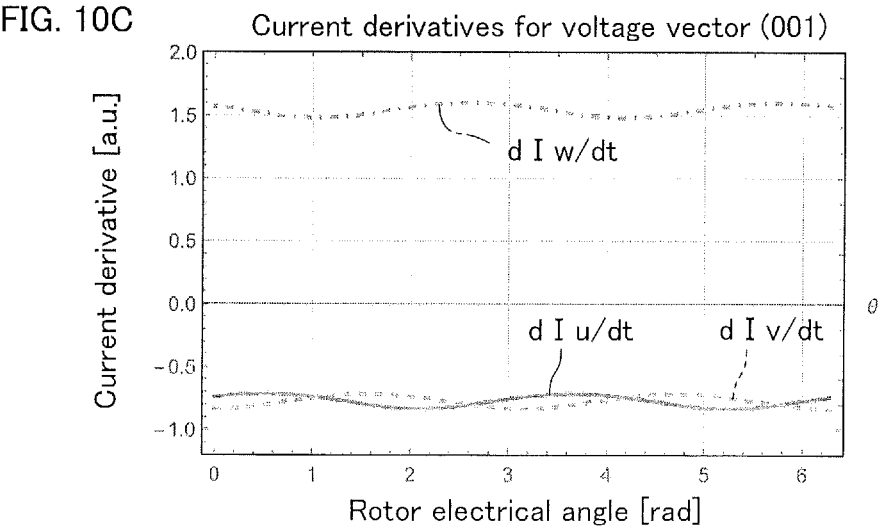

Further, the current derivatives are computed from the expression (4) based on the ideal sinusoidal waveform inductances shown in FIG. 8. The results of the computation are shown in FIGS. 10A, 10B and 10C. FIG. 10A shows the current derivatives to be obtained when the voltage vector V1(100) is applied, and FIG. 10B shows the current derivatives to be obtained when the voltage vector V3(010) is applied. FIG. 10C shows the current derivatives to be obtained when the voltage vector V5(001) is applied. FIGS. 10A, 10B and 10C show changes in the U-phase, V-phase and W-phase current derivatives with respect to the rotor electrical angle. The detection gain and the voltage gain are 1.

Figure 11A:
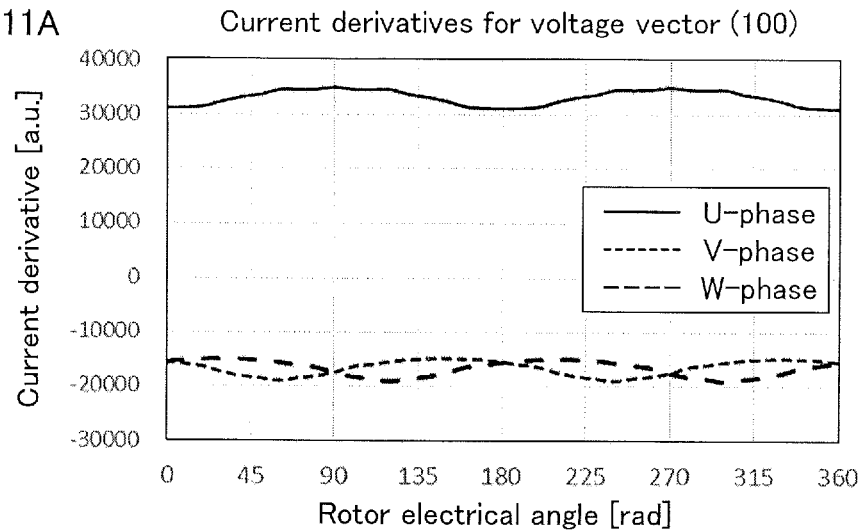
FIGS. 11A, 11B and 11C respectively show current derivatives determined by a magnetic analysis performed by inputting the three voltage vectors to a three-phase surface magnet motor and changing the rotor position in one rotation cycle of electrical angle with a motor q-axis current maintained at zero.
Figure 11B:
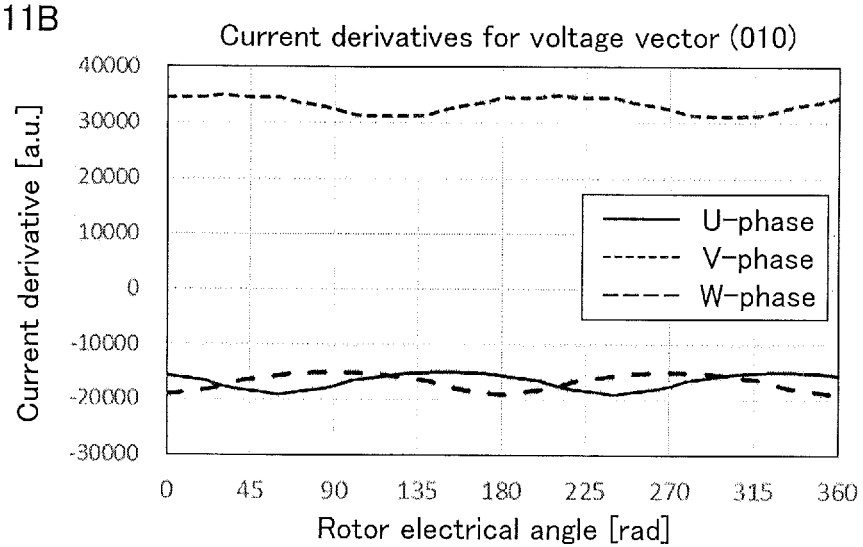
Figure 11C:
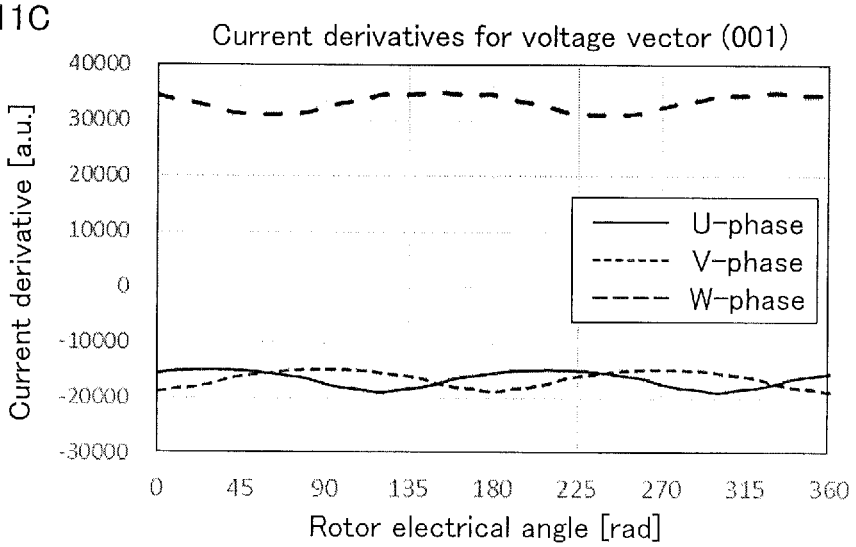
Figure 11D:
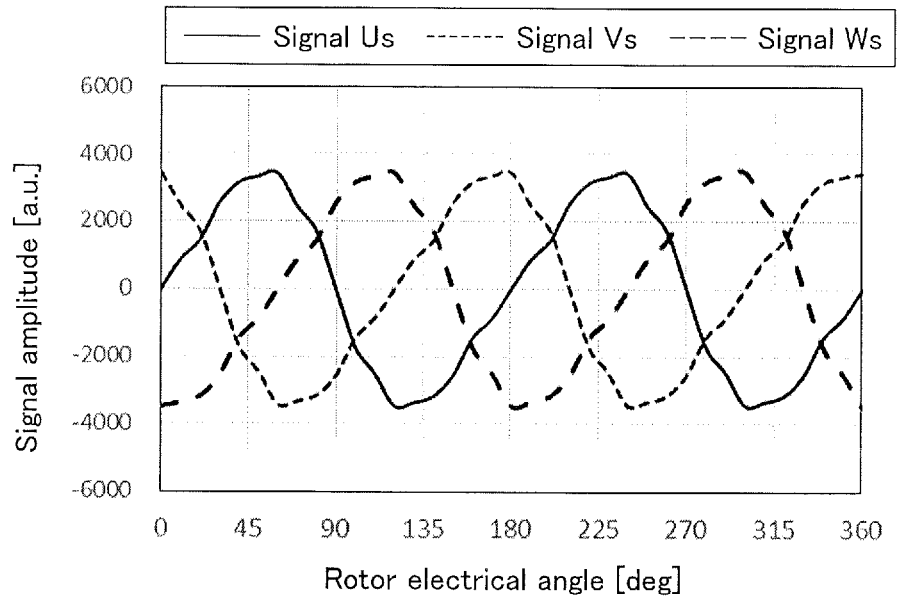
FIG. 11D shows three-phase position estimation signals Us, Vs, Ws.
Figure 11E:
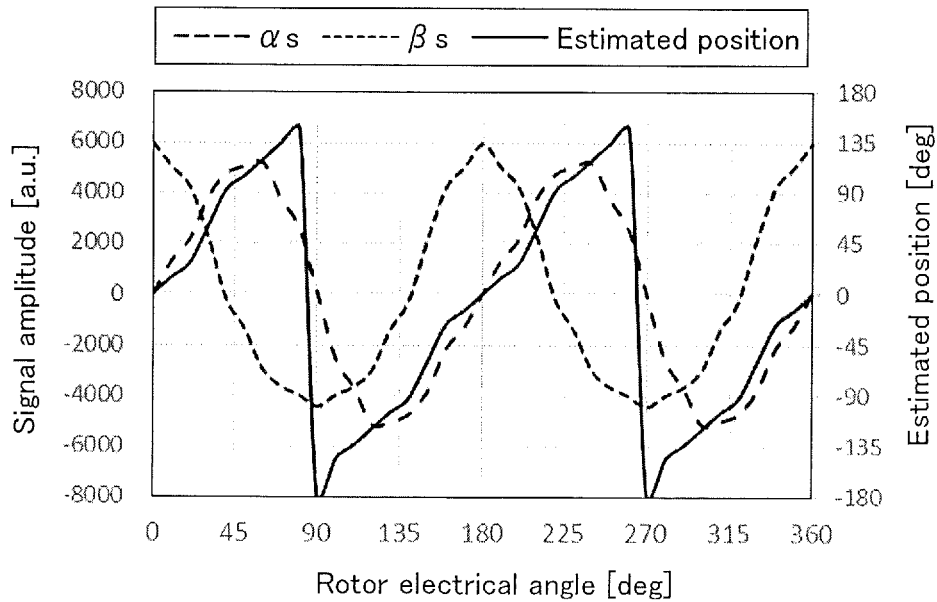
FIG. 11E shows two-phase position estimation signals αs, βs on the αβ fixed coordinate system, and an estimated position determined based on the two-phase position estimation signals αs, βs.

By way of example, current derivatives determined by a magnetic analysis performed by inputting the aforementioned three voltage vectors to the three-phase surface magnet type motor and changing the rotor position in one rotation cycle of electrical angle with the motor q-axis current maintained at zero, and an estimated position computed from the expressions (5) and (11) are shown in FIGS. 11A to 11E. FIG. 11A shows current derivatives obtained when the voltage vector V1(100) was applied, and FIG. 11B shows current derivatives obtained when the voltage vector V3(010) was applied. FIG. 11C shows current derivatives obtained when the voltage vector V5(001) was applied, and FIG. 11D shows three-phase position estimation signals Us, Vs, Ws computed from the expression (5). Further, FIG. 11E shows two-phase position estimation signals $\alpha s$, $\beta s$ on the $\alpha\beta$ fixed coordinate system computed from the expression (11), and an estimated position $\theta$ determined based on the two-phase position estimation signals $\alpha s$, $\beta s$. The three-phase position estimation signals Us, Vs, Ws, which each have a waveform superposed with a harmonic waveform, can be each virtually regarded as a sinusoidal waveform. Thus, the estimated position $\theta$ can be computed.

Figure 12A:
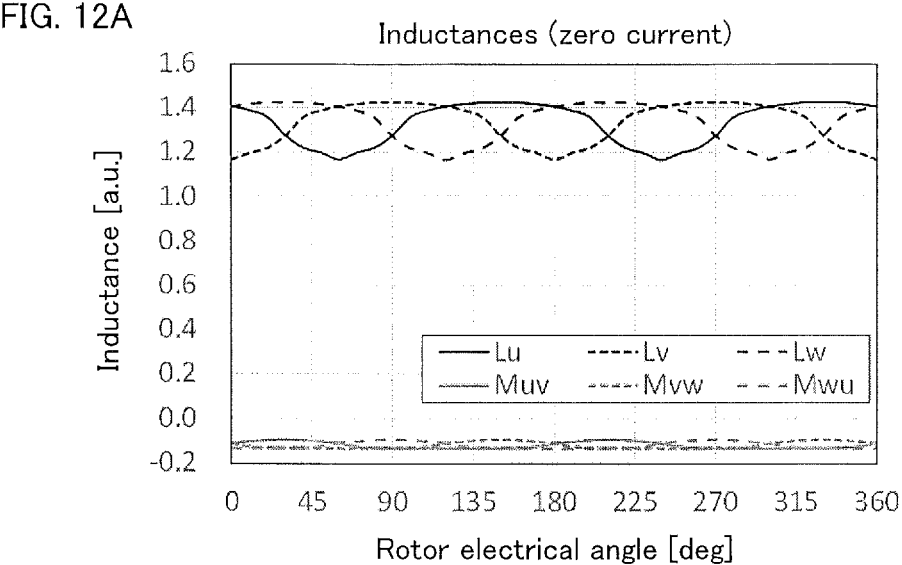
FIGS. 12A and 12B respectively show motor inductances Lu, Lv, Lw, Muv, Mvw, Mwu and interlinkage magnetic fluxes of respective phase coils determined by the magnetic analysis performed under the conditions used for FIGS. 11A to 11E.
Figure 12B:
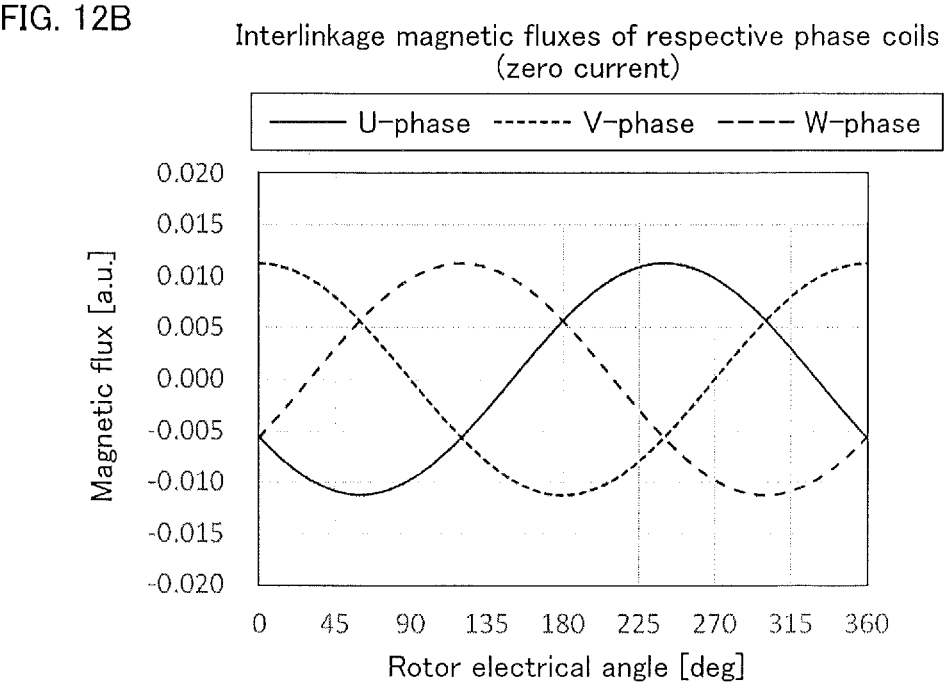

FIGS. 12A and 12B respectively show motor inductances Lu, Lv, Lw, Muv, Mvw, Mwu and interlinkage magnetic fluxes of the respective phase coils (windings) determined by the magnetic analysis performed under the conditions used for FIGS. 11A to 11E. A comparison with FIG. 8 indicates that the three-phase position estimation signals Us, Vs, Ws of FIG. 11D are not in an ideal sinusoidal waveform because the waveforms of the inductances are offset from the ideal sinusoidal waveforms and a higher-order term of the ratio $\alpha$ between the offset amount of the inductance and the amplitude of the inductance (standardized inductance amplitude) is contained in the expression (13).

Figure 13A:
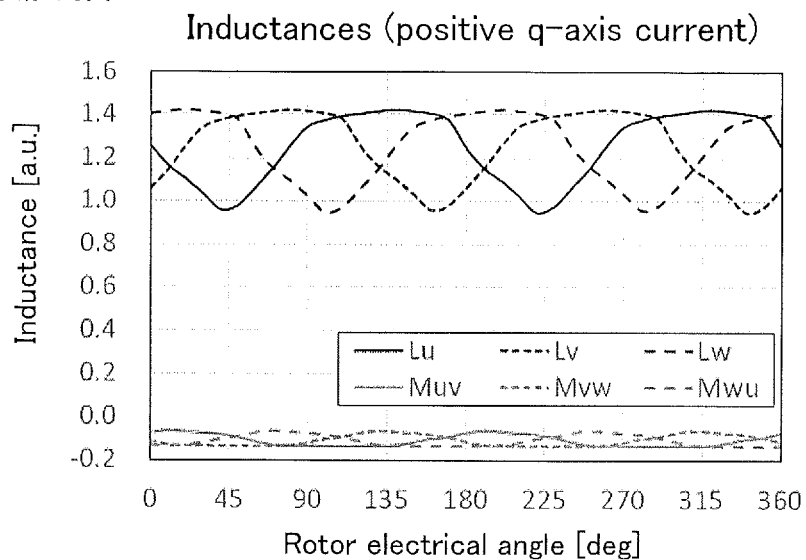
FIGS. 13A and 13B respectively show motor inductances Lu, Lv, Lw, Muv, Mvw, Mwu and interlinkage magnetic fluxes of the respective phase coils determined by a magnetic analysis with a positive q-axis current, and FIGS. 13C and 13D respectively show motor inductances Lu, Lv, Lw, Muv, Mvw, Mwu and interlinkage magnetic fluxes of the respective phase coils determined by a magnetic analysis with a negative q-axis current.
Figure 13B:
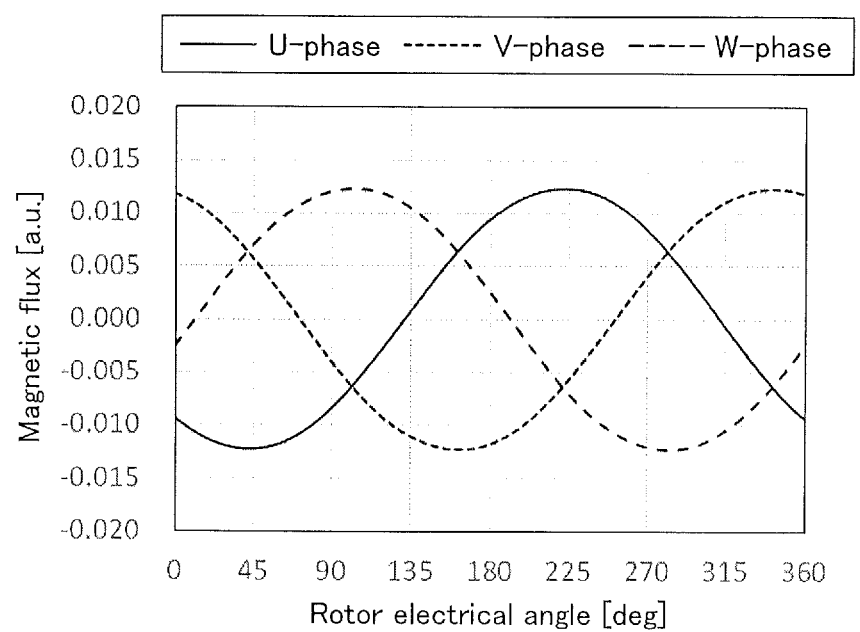
Figure 13C:
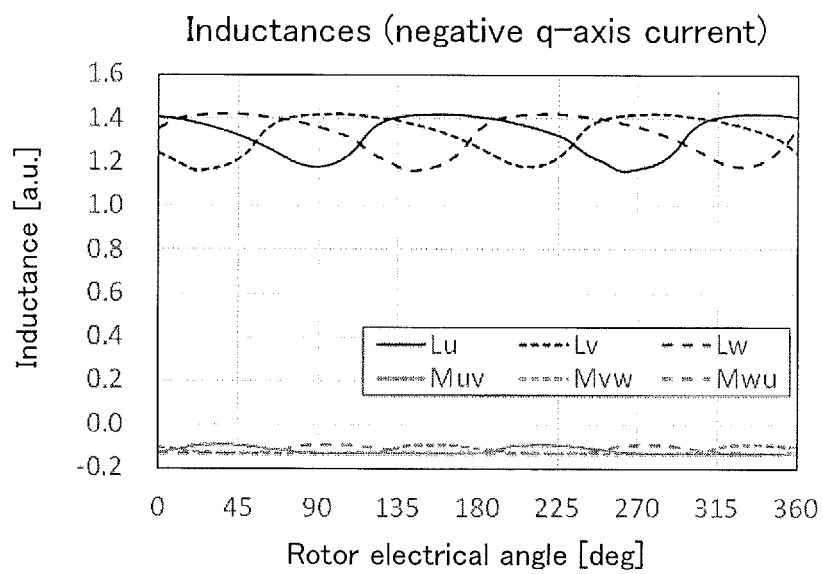
Figure 13D:
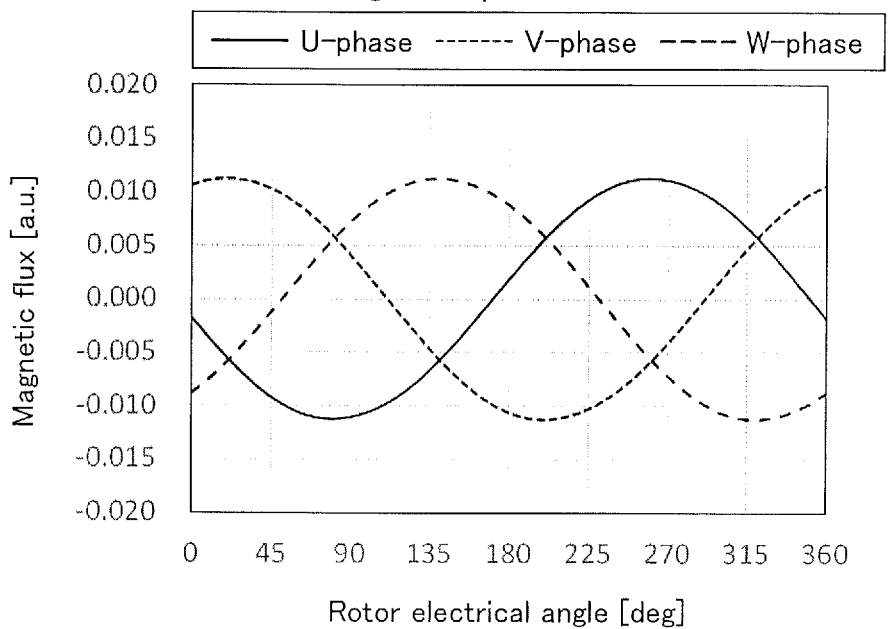

Next, the results of an analysis performed in substantially the same manner as described above with a positive or negative motor q-axis current are shown in FIGS. 13A, 13B, 13C and 13D. FIGS. 13A and 13B show motor inductances Lu, Lv, Lw, Muv, Mvw, Mwu and interlinkage magnetic fluxes of the respective phase coils (windings) determined by the magnetic analysis performed with the positive q-axis current. FIGS. 13C and 13D show motor inductances Lu, Lv, Lw, Muv, Mvw, Mwu and interlinkage magnetic fluxes of the respective phase coils (windings) determined by the magnetic analysis performed with the negative q-axis current. In these figures, the positive and negative rotor electrical angles are defined such that, when the q-axis current is positive under no-load conditions, the rotor electrical angle advances in a plus direction (angle advance direction). In other words, a direction in which the torque is generated when the q-axis current is positive is defined as the positive direction of the rotor electrical angle.

It can be seen that the interlinkage magnetic fluxes of the coils are shifted in the angle advance direction (torque generation direction) with the positive q-axis current, and shifted in an angle retard direction (torque generation direction) with the negative q-axis current as compared with a q-axis current of zero. The inductances may vary in amplitude depending on the direction (positive or negative direction) of the magnetic resistance along the d-axis, or may contain a harmonic component due to slot combination. However, it may be generally considered that the phases of the self-inductances Lu, Lv, Lw and the phases of the mutual inductances Muv, Mvw, Mwu are shifted in the same directions as the interlinkage magnetic fluxes of the coils.

Figure 14A:
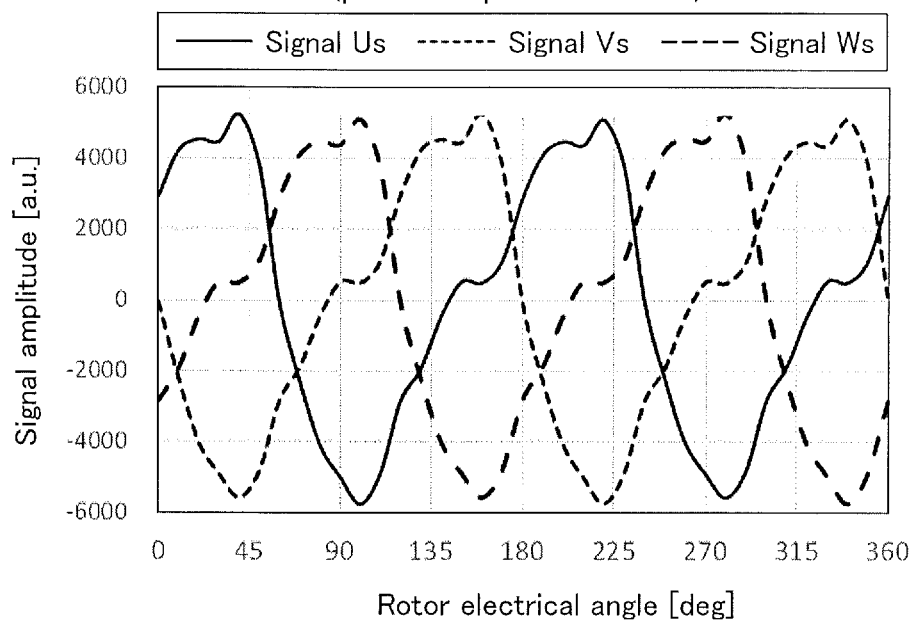
FIG. 14A shows three-phase position estimation signals Us, Vs, Ws determined with the positive q-axis current.
Figure 14B:
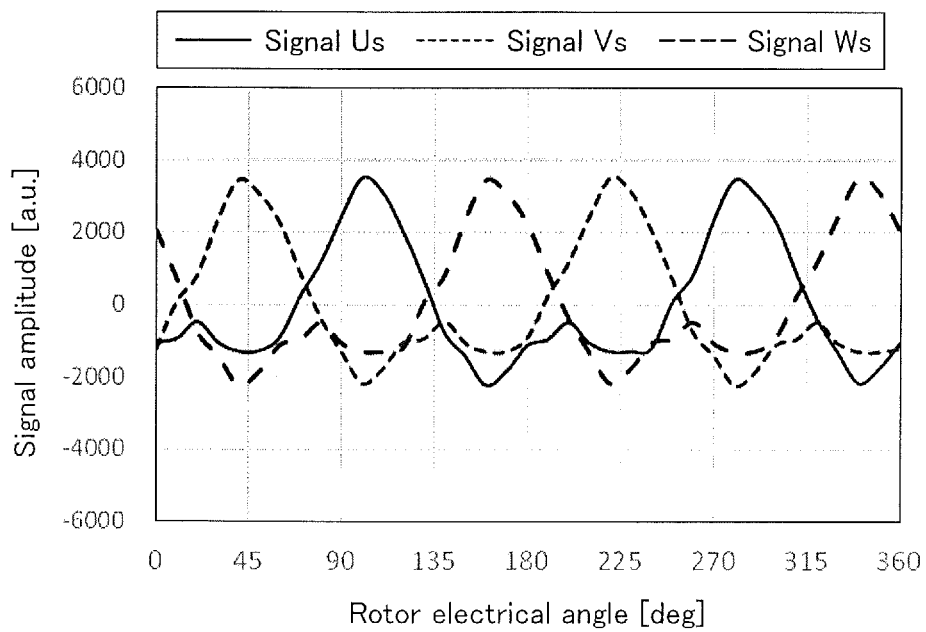
FIG. 14B shows three-phase position estimation signals Us, Vs, Ws determined with the negative q-axis current.
Figure 14C:
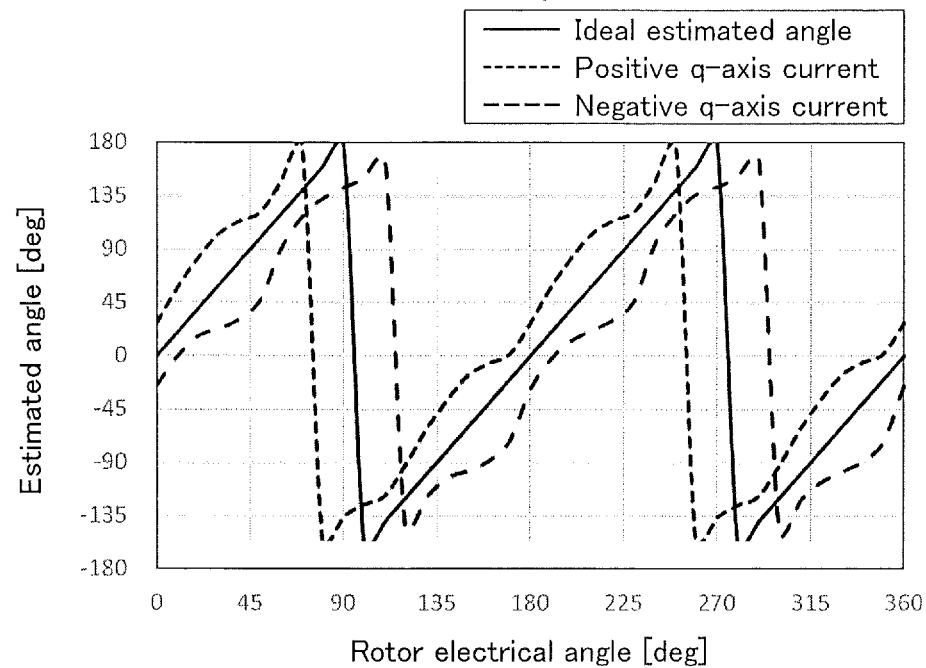
FIG. 14C shows estimated positions respectively computed for the positive q-axis current and for the negative q-axis current.
Figure 14D:
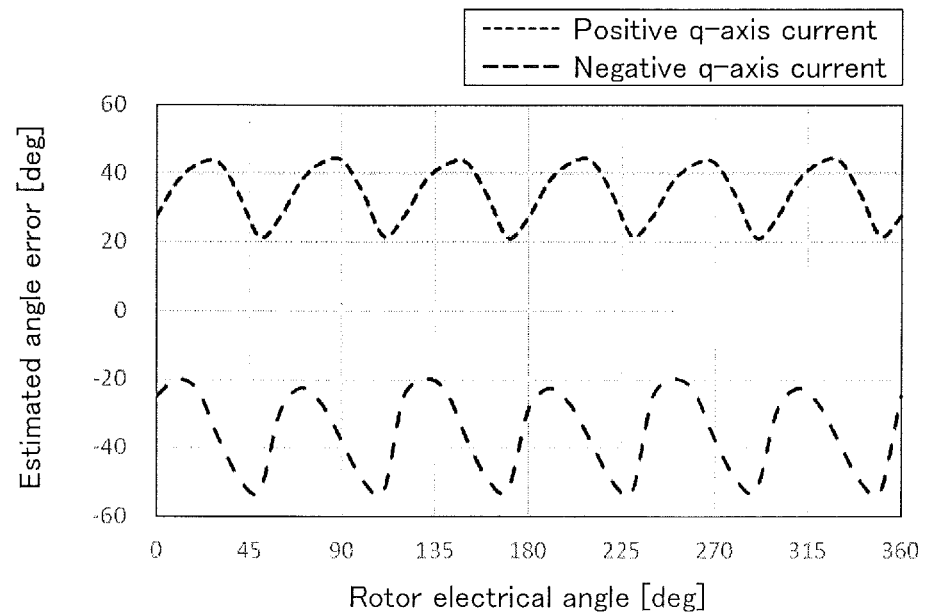
FIG. 14D shows deviations of the estimated positions from an ideal estimation angle for the positive q-axis current and for the negative q-axis current.

Three-phase position estimation signals and an estimated position determined by an analysis performed by applying a q-axis current are shown in FIGS. 14A, 14B and 14C. FIG. 14A shows three-phase position estimation signals Us, Vs, Ws computed from the expression (5) for the positive q-axis current. FIG. 14B shows three-phase position estimation signals Us, Vs, Ws computed from the expression (5) for the negative q-axis current. FIG. 14C shows estimated positions θ computed from the expression (11) for the positive q-axis current and for the negative q-axis current. In FIG. 14C, an ideal estimation angle is also shown, which is a rotor electrical angle (analytic true value) used for the analysis. FIG. 14D shows the deviations of the estimated positions from the ideal estimation angle (estimated angle errors) for the positive q-axis current and for the negative q-axis current.

As shown, with the phase shift of the inductances, the estimated position θ is deviated from the ideal estimation angle in the positive direction (torque generation direction) when the q-axis current is positive, and is deviated from the ideal estimation angle in the negative direction (torque generation direction) when the q-axis current is negative. As the deviation of the estimated position θ from the ideal estimation angle increases, the torque is reduced, resulting in the step-out of the motor in the worst case.

Figure 15A:
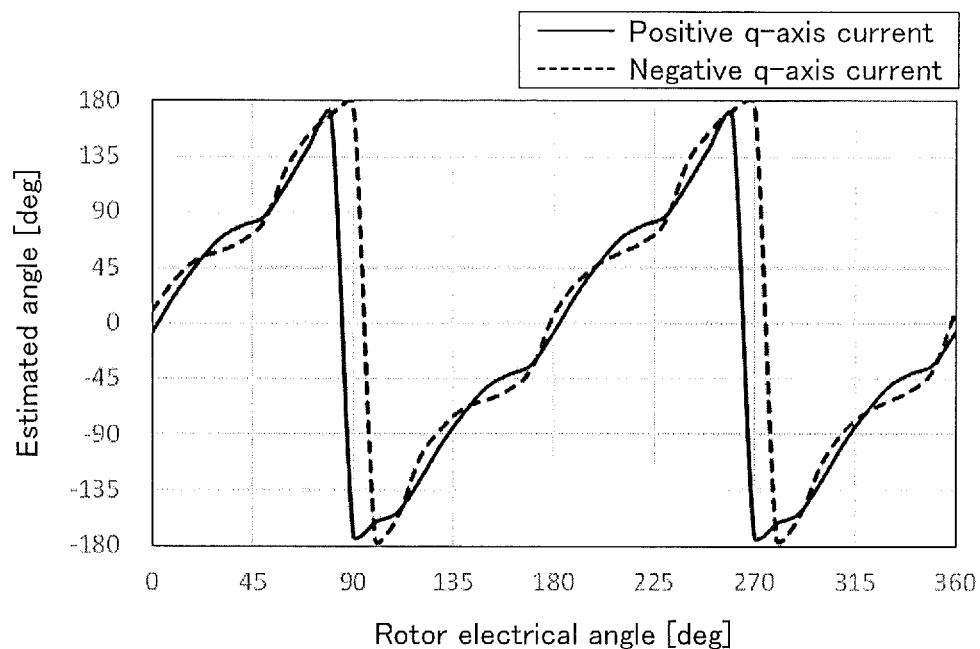
FIG. 15A shows estimated positions corrected by translation correction.
Figure 15B:
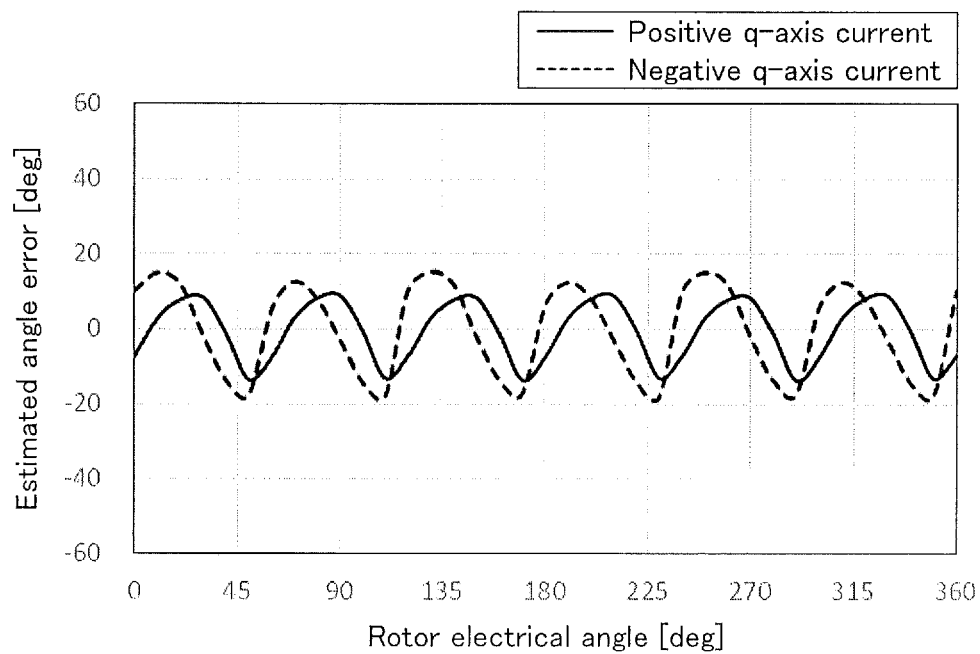
FIG. 15B shows deviations of the estimated positions corrected by the translation correction.

To cope with this, a correction amount represented by a function of the q-axis current is incorporated. For example, a correction amount C1 (C1=k·Iq) is determined by multiplying the q-axis current value Iq by a proportionality constant k (k>0), and translation correction (first correction) is performed by subtracting the correction amount C1 from the uncorrected estimated position θ. In the translation correction, the estimated position θ is shifted in the torque generation direction by the absolute value of the correction amount C1 (first correction amount). Estimated positions $\theta_{c1}$ (=θ−C1) corrected by the translation correction when the q-axis current is positive and when the q-axis current is negative are shown in FIG. 15A. Further, deviations of the estimated positions $\theta_{c1}$ corrected by the translation correction from the ideal estimation angle (estimated angle errors) are shown in FIG. 15B.

The estimated angle errors (see FIG. 14D), which are about ±50 degrees before the correction, are reduced within ±20 degrees. As shown, the problem of the estimation error attributable to the inductance phase shift due to the increase in the q-axis current (the increase in the absolute value) can be solved by this correction.

In this example, the proportional expression is used as the function of the q-axis current. Alternatively, the translation correction may be performed by incorporating a correction amount determined by utilizing a function containing a higher-order term of the q-axis current. This makes it possible to provide a value closer to the ideal estimation value according to the change in the q-axis current.

After the estimated position $\theta_{c1}$ corrected by the translation correction is thus computed, the estimation angle error is reduced by further performing a harmonic correction (second correction).

For example, a correction amount C2 containing a n-th harmonic (wherein n is a natural number of 2 or greater, e.g., n=3) with respect to the estimated position θ is incorporated as a harmonic correction amount. More specifically, a harmonic correction amount C2 (second correction amount) represented by the following expression (33) is incorporated as an n-th harmonic having an amplitude equivalent to the q-axis current value Iq. The harmonic correction amount C2 is a function of the estimated position θ and the q-axis current value Iq, more specifically, a product of a function of the q-axis current value and a harmonic component having a phase defined by the estimated position θ (i.e., the estimated position $\theta_{c1}$ corrected by the translation correction). The function of the q-axis current value is the q-axis current value itself in the following expression (33) but, for example, may be a function of the q-axis current value multiplied by a proportionality constant or may be a function containing a higher-order term.

$$C2 = \mathrm{Sin}(n\theta_{c1}+\delta) \times Iq \tag{33}$$

Figure 16A:
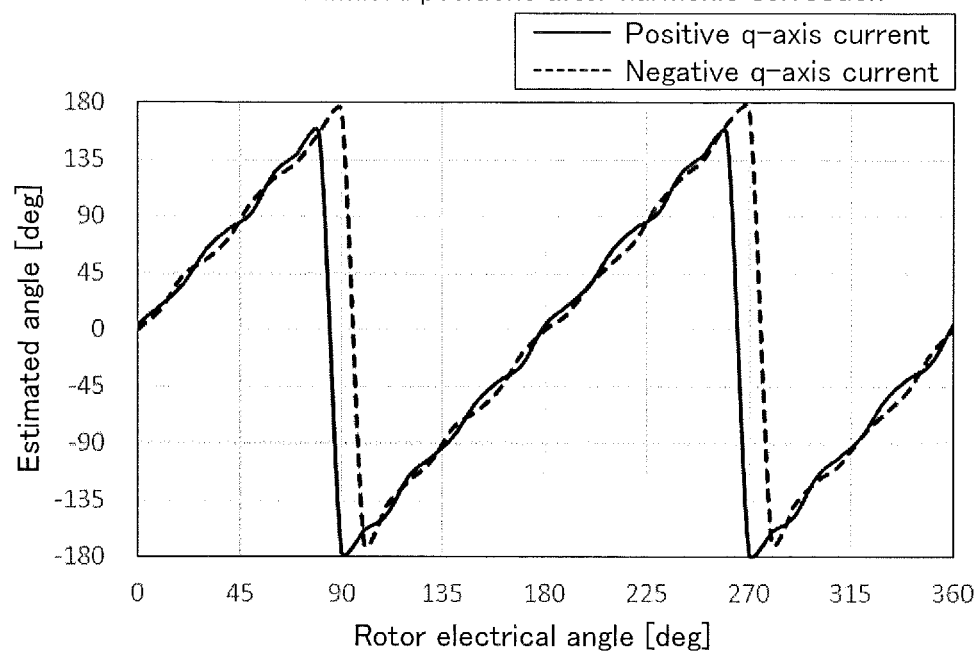
FIG. 16A shows estimated positions corrected by harmonic correction.
Figure 16B:
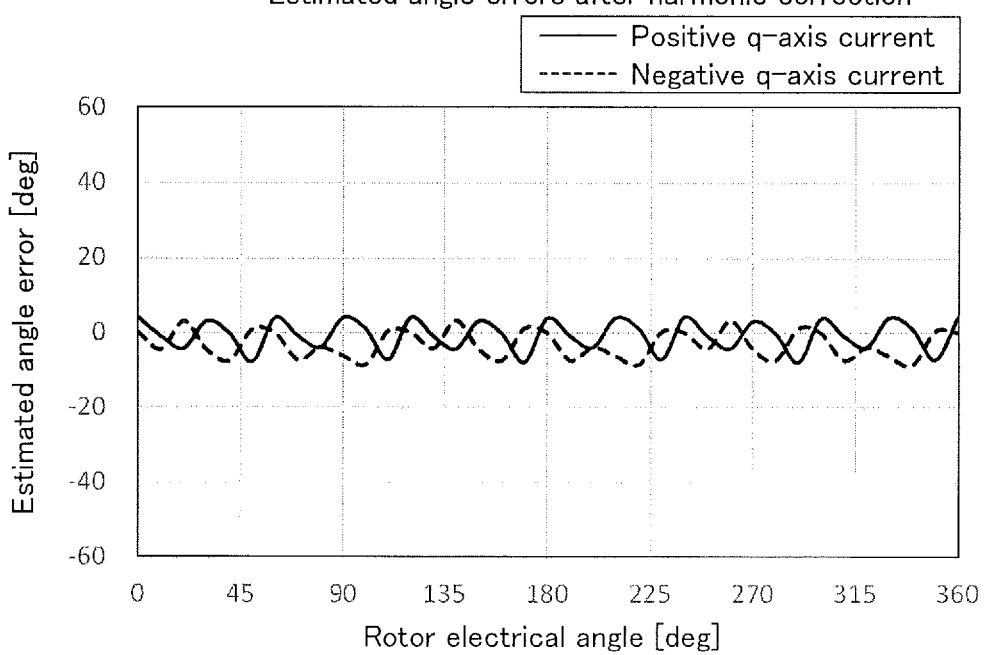
FIG. 16B shows deviations of the estimated positions corrected by the harmonic correction.

The harmonic correction amount C2 is further subtracted from the estimated position $\theta_{c1}$ corrected by the translation correction, whereby the estimated position $\theta_{c2}$ corrected by the harmonic correction is represented by the following expression (34):

$$\theta_{c2} = \theta_{c1} - Iq \cdot \mathrm{Sin}(n\theta_{c1}+\delta) = \theta - C1 - Iq \cdot \mathrm{Sin}(n(\theta-C1)+\delta) \tag{34}$$

Where n=3, the corrected estimated position $\theta_{c2}$ and the estimated angle error are respectively shown in FIGS. 16A and 16B. Here, a phase offset δ may be selected so as to reduce the estimation error.

As shown in FIG. 16B, the estimated position error is reduced within ±8 degrees by performing the harmonic correction in addition to the translation correction. Thus, the torque ripples attributable to the estimated position error can be reduced. In the harmonic correction in the example shown in FIGS. 16A and 16B, only the third harmonic is reduced, but a higher harmonic correction may be performed. As in the translation correction, the estimated position error can be further reduced by performing a correction with the use of a correction amount defined by a function containing a higher-order term of the q-axis current.

Further, where the inductance phase shift due to the q-axis current is small, only the harmonic correction may be performed with the translation correction omitted. In this case, C1=0 and, therefore, the corrected estimated position is represented by the following expression (35):

$$\theta_{C2} = \theta - Iq \cdot \mathrm{Sin}(n\theta + \delta) \tag{35}$$

Alternatively, only the translation correction may be performed without the harmonic correction omitted.

In the above example, the correction amounts C1, C2 are defined with the use of the functions based on the q-axis current value Iq and the uncorrected estimated position θ. The correction amounts may be preliminarily tabulated rather than determined with the use of the functions. Further, the corrected estimated position per se may be tabulated rather than determined by generating the correction amounts with the use of the functions or the tables of the correction amounts.

The translation correction and/or the harmonic correction are performed by the compensator 152 (see FIG. 2) to generate the corrected estimated position θfb. That is, the estimated position θfb may be θfb=$\theta_{c2}$. Where only the translation correction is performed, the estimated position θfb is θfb=$\theta_{C1}$.

The above example is directed to the surface magnet type motor. Where an embedded magnet type motor is used, the shifts of inductance waveforms due to the shifts of the interlinkage magnetic fluxes of the coils, and the superposition of the harmonic component on the estimated value similarly occur more or less.

Figure 17A:
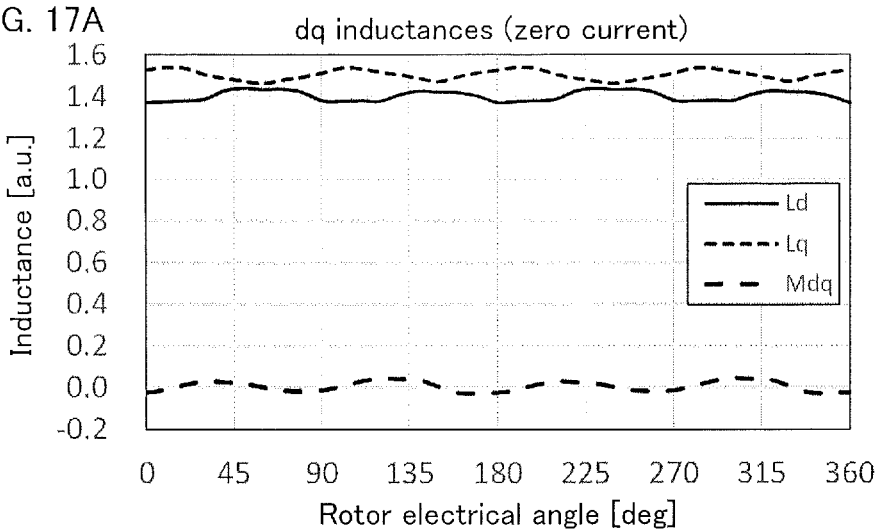
FIGS. 17A and 17B respectively show the results of transformation of the inductances on the UVW fixed coordinate system shown in FIG. 12A to inductances on the dq rotational coordinate system and on the αβ fixed coordinate system.
Figure 17B:
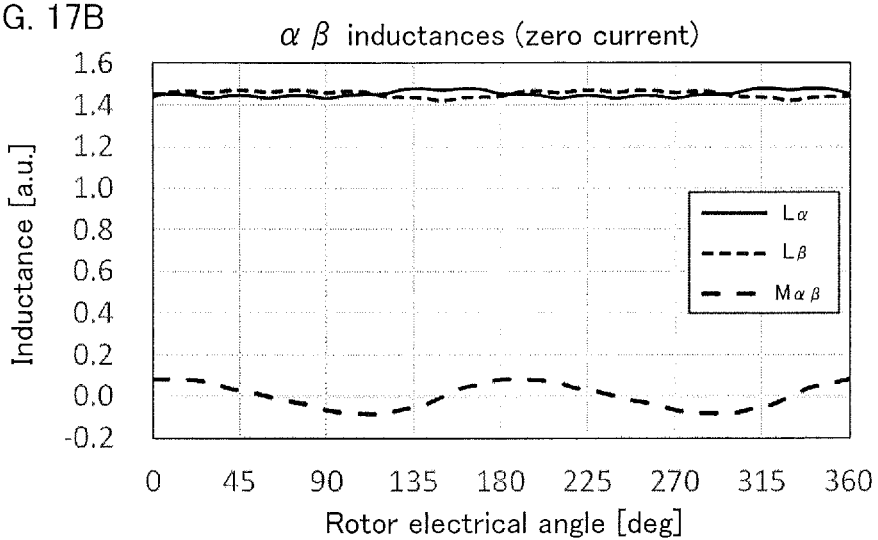
Figure 17C:
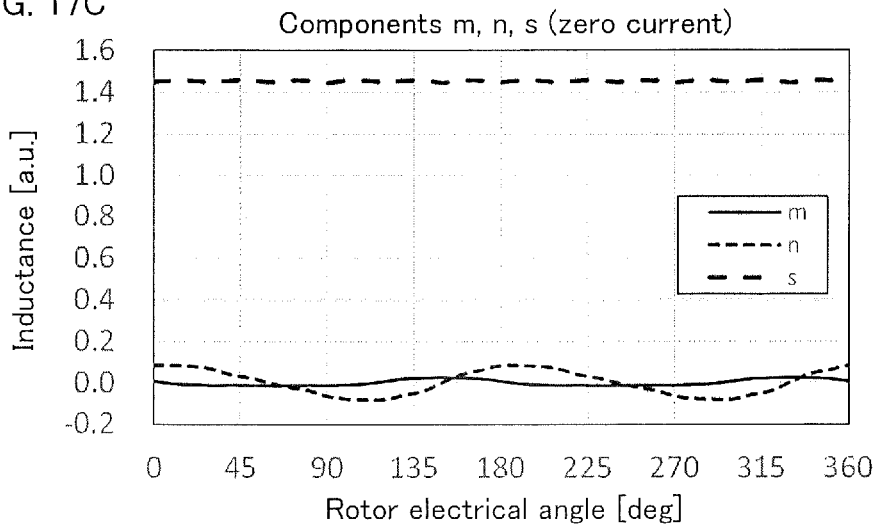
FIG. 17C shows relevant components m, n, s.

FIGS. 17A and 17B show the results of the transformation of the inductances on the UVW fixed coordinate system shown in FIG. 12A to inductances on the αβ fixed coordinate system and on the dq rotational coordinate system, respectively, by using the expressions (29), (30) and (31). FIG. 17C shows relevant components m, n, s.

Since the changes in the inductances shown in FIG. 12A are not in a perfect sinusoidal waveform, the inductances Ld, Lq on the dq rotational coordinate system are dependent on the rotor position. In addition, the mutual inductance Mdq which is a dq-axis interference component is not zero. As determined from the results shown in FIG. 17A, average inductances Ld and Lq with respect to the rotor electrical angle are Ld=1.4 and Lq=1.5, respectively, and an average saliency ratio Lq/Ld is Lq/Ld=1.07.

This indicates that the position estimation can be achieved with satisfactory accuracy even in the case of the surface magnet type motor which has a smaller saliency ratio, e.g., has a saliency ratio of about 7% on average without excitation and has a saliency ratio of about 1% depending on the rotor electrical angle.

A three-phase surface magnet type motor having the same conditions as specified in the aforementioned analyses was prepared as an actual model motor, and the PWM patterns were applied to this motor. The current transformers each having a gain variable due to the magnetic saturation depending on the current magnitude were used as the current derivative detectors 4uvw to acquire the current derivatives for the position estimation. The results are shown below.

Figure 18A:
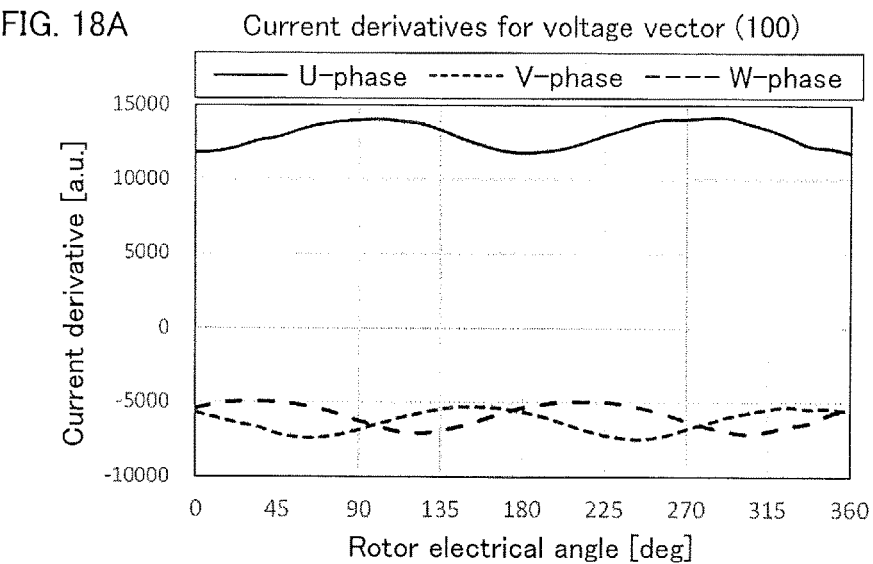
FIGS. 18A, 18B and 18C respectively show current derivatives obtained by using the three voltage vectors with the motor current maintained at zero.
Figure 18B:
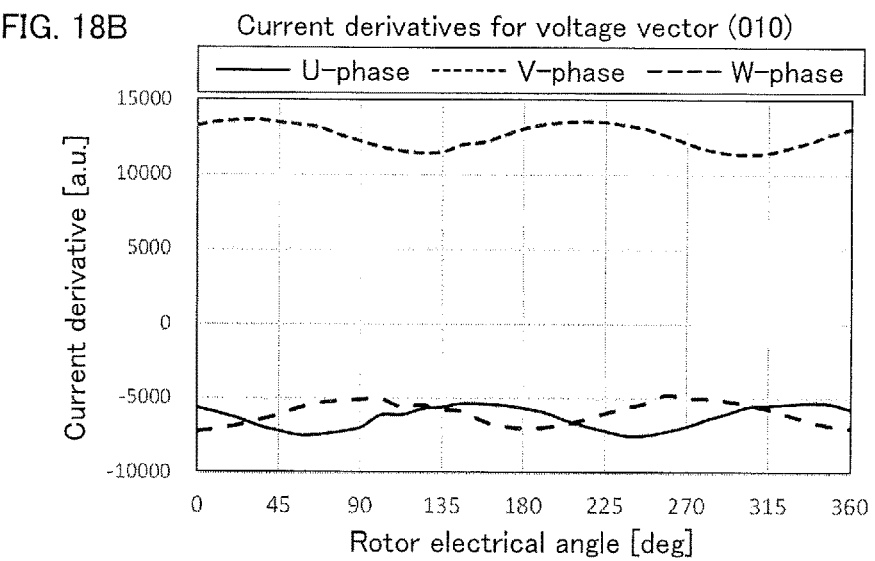
Figure 18C:
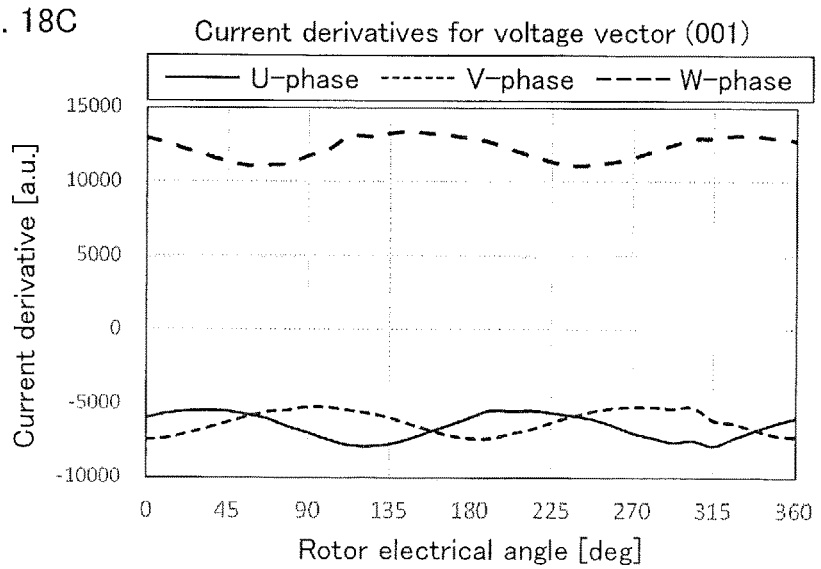
Figure 18D:
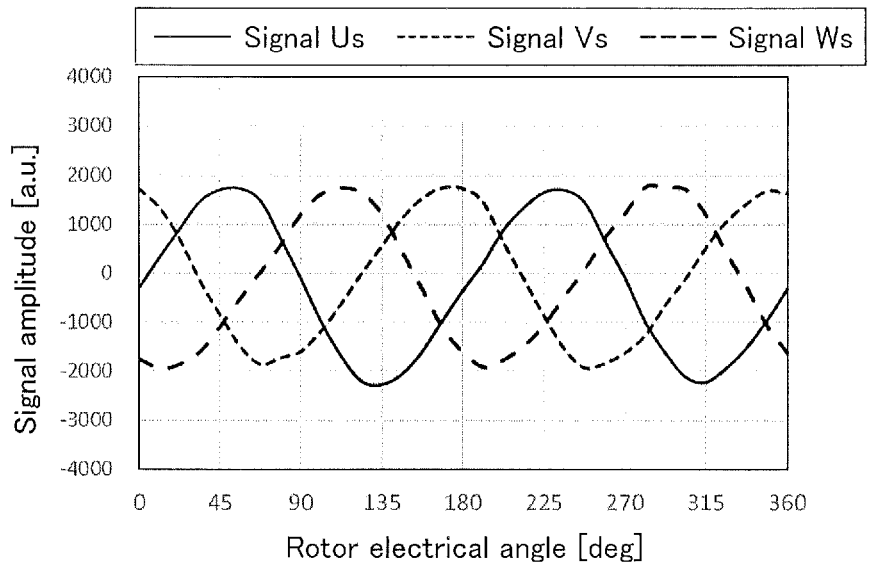
FIG. 18D shows three-phase position estimation signals Us, Vs, Ws each defined based on a difference between current derivatives of the same phase.
Figure 18E:
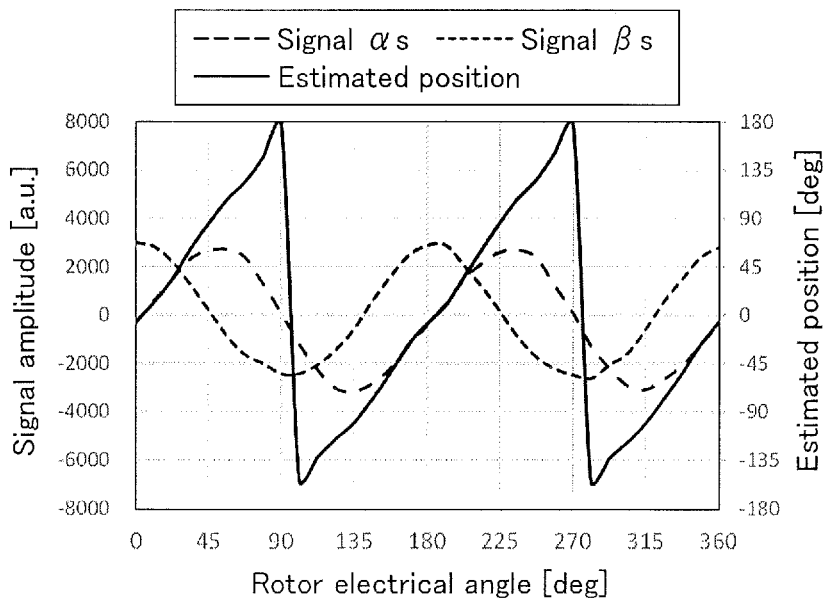
FIG. 18E shows an estimated position computed based on these three-phase position estimation signals Us, Vs, Ws.

FIGS. 18A, 18B and 18C respectively show current derivatives obtained by using the three voltage vectors V1(100), V3(010), V5(001) with the motor current maintained at zero. FIG. 18D shows three-phase position estimation signals Us, Vs, Ws each obtained based on a difference between current derivatives of the same phase from the expression (5). FIG. 18E shows an estimated position computed from the expression (11) based on the three-phase position estimation signals Us, Vs, Ws. When the current is zero, the estimated position can be computed as indicated by the results of the analyses.

Figure 19A:
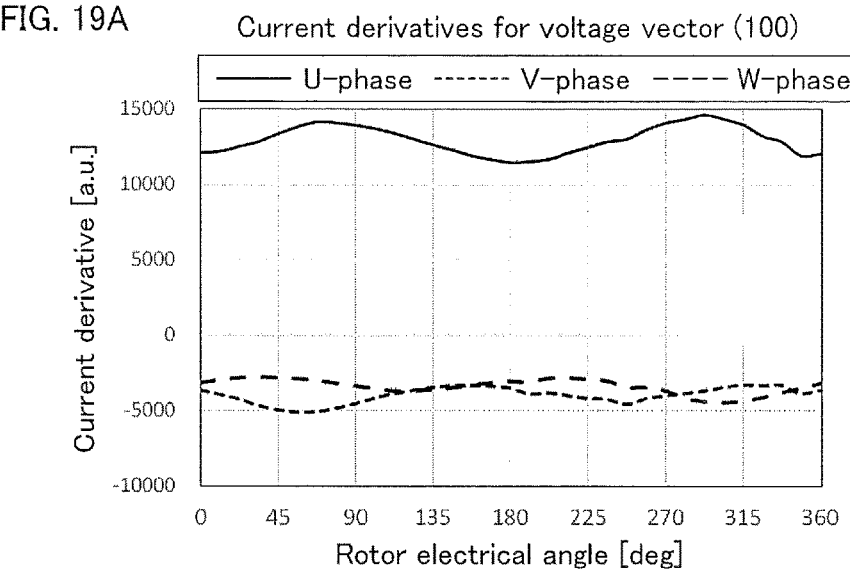
FIGS. 19A, 19B and 19C show current derivatives acquired when the motor was externally forcibly rotated by applying a zero current, a positive current and a negative current to U-phase, V-phase and W-phase motor lines, respectively, by fixed phase excitation.
Figure 19B:
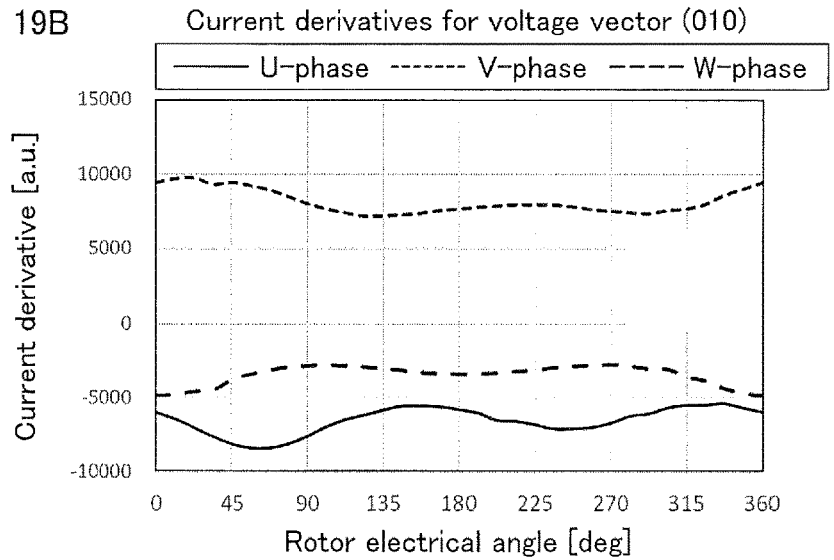
Figure 19C:
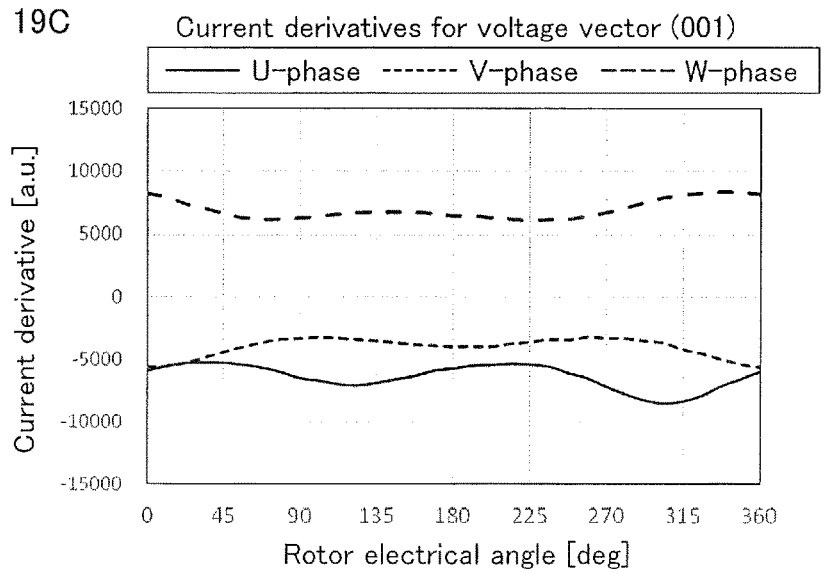

FIGS. 19A, 19B and 19C show current derivatives acquired when the motor was forcibly externally rotated by applying a zero current, a positive current and a negative current to the U-phase, V-phase and W-phase motor lines, respectively, by fixed phase excitation. FIGS. 19A, 19B and 19C respectively show current derivatives acquired when the voltage vectors V1(100), V3(010), V5(001) were applied. A relationship between the rotor electrical angle on the abscissa and the excitation angle phase is such that a rotor electrical angle of 0 degree corresponds to d-axis excitation, a rotor electrical angle of 90 degrees corresponds to q-axis excitation, and a rotor electrical angle of 180 degrees corresponds to d-axis reverse excitation.

For example, a comparison among a U-phase signal for the pattern of the voltage vector V1(100) (see FIG. 19A), a V-phase signal for the pattern of the voltage vector V3(010) (see FIG. 19B) and a W-phase signal for the pattern of the voltage vector V5(001) (see FIG. 19C) which intrinsically have the same signal level indicates that the V-phase signal and the W-phase signal are each attenuated to about one half the ideal level due to the saturation of the magnetic bodies of the current transformers of the current derivative detectors 4uvw.

Figure 20A:
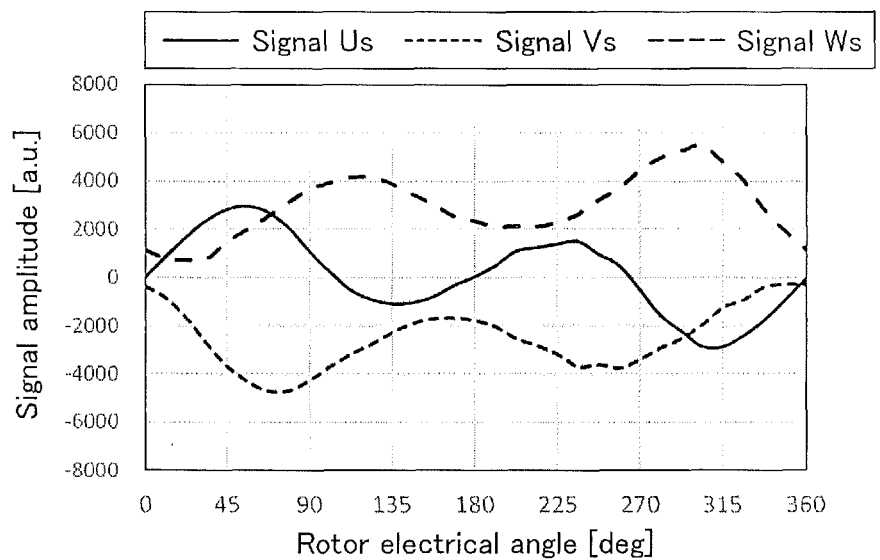
FIG. 20A shows three-phase position estimation signals Us, Vs, Ws defined based on the current derivatives of FIGS. 18A, 18B, 18C by using only two voltage vectors.
Figure 20B:
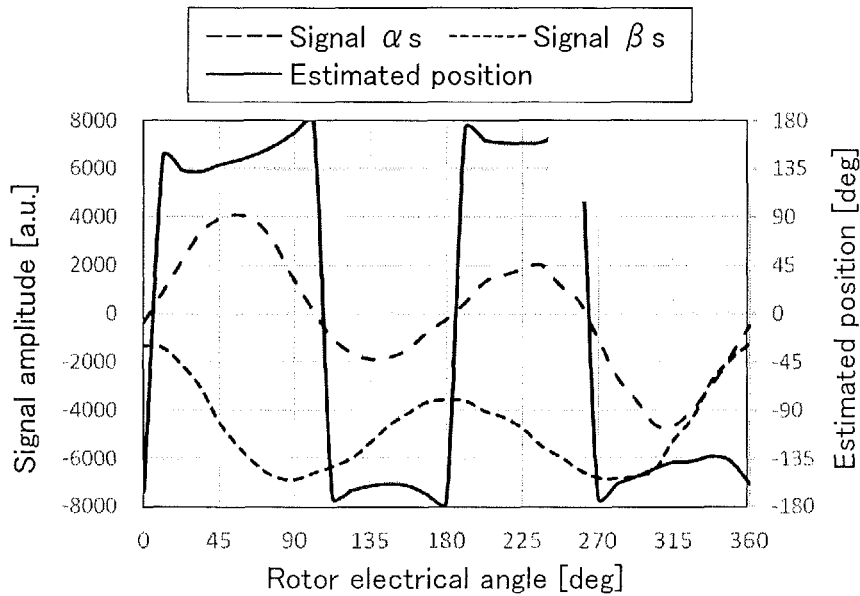
FIG. 20B shows an estimated position computed by using these three-phase position estimation signals Us, Vs, Ws.

FIG. 20A shows three-phase position estimation signals Us, Vs, Ws defined based on the current derivatives of FIGS. 18A, 18B and 18C by the expression (7) using only two voltage vectors V5(001), V3(010). FIG. 20B shows an estimated position computed from the expression (11) based on the three-phase position estimation signals Us, Vs, Ws.

As can be understood from the expression (7), the signals Vs, Ws each contain a difference between the current derivatives of different phases and, therefore, contain different gains. The subtraction of the signals having the different gains makes it impossible to properly compute the three-phase signals and, hence, to correctly compute the estimated position.

The three-phase position estimation signals seem to be simply offset. In this example, the V-phase current and the W-phase current have the same absolute value. Therefore, it is considered that the three-phase position estimation signals behave in the same manner as in the case where the V-phase and the W-phase have the same gain and the offset occurs. In reality, however, the U-phase current, the V-phase current and the W-phase current change with time, and the gains of the respective phases also behave without specific limitations. In reality, therefore, the three-phase position estimation signals change in a complicated manner according to the motor current due to the terms of the sums and the differences in the expression (8). This makes it difficult to correct the three-phase position estimation signals.

Therefore, where the two voltage vectors are used for the detection of the rotor position, it is preferred to use current derivative detectors each including an element configured to avoid the saturation of the magnetic body. For example, it is preferred to use an element such as a current transformer including an air-core coil.

Figure 21A:
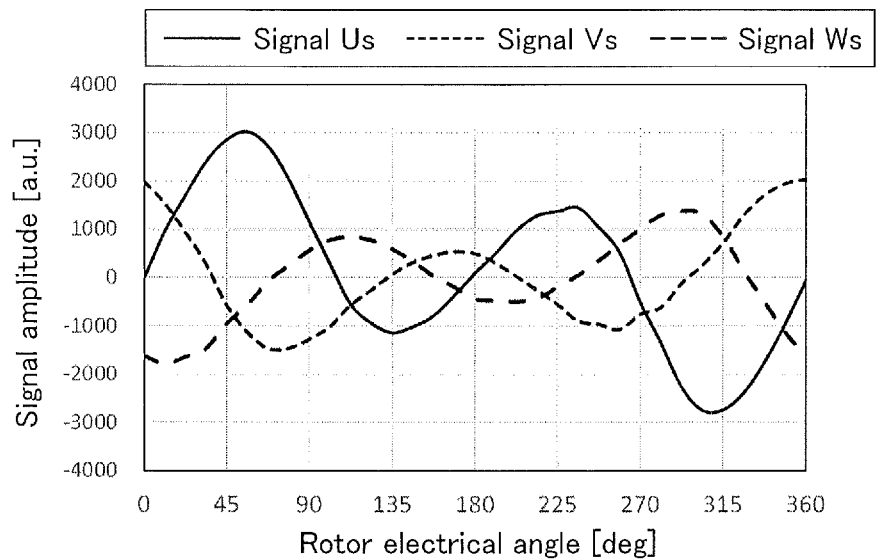
FIG. 21A shows three-phase position estimation signals Us, Vs, Ws each defined based on a difference between current derivatives of the same phase in FIGS. 18A, 18B, 18C by way of example.
Figure 21B:
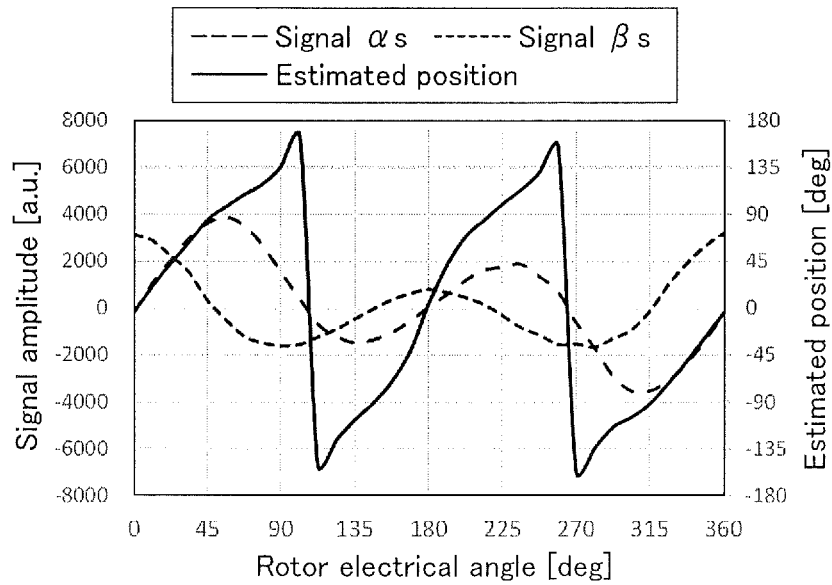
FIG. 21B shows an estimated position computed by using these three-phase position estimation signals Us, Vs, Ws.

FIG. 21A shows three-phase position estimation signals Us, Vs, Ws each defined based on a difference between current derivatives of the same phase in FIGS. 18A, 18B and 18C by using the expression (5) by way of example. FIG. 21B shows an estimated position computed based on the three-phase position estimation signals Us, Vs, Ws from the expression (11). As shown, it is possible to compute the estimated position while suppressing the influence of the gains of the current derivative detectors 4uvw by the subtraction of the signals of the same phase. The deviation of the estimated position is attributable to the gains gu, gv, gw factored out from the respective expressions in the expression (6). Specifically, the gains gv, gw are about one half the gain gu, so that the amplitudes of the three-phase position estimation signals Vs, Ws are about one half the amplitude of the three-phase position estimation signal Us. This is the cause of the deviation of the estimated position.

The deviation can be easily corrected simply by multiplying the three-phase position estimation signals by gains according to the current. Three-phase position estimation signals Us, Vs, Ws recomputed with the signals Vs, Ws of FIG. 21A amplified twice are shown in FIG. 22A, and an estimated position recomputed from the expression (11) based on the recomputed three-phase position estimation signals Us, Vs, Ws is shown in FIG. 22B. As shown, the three-phase position estimation signals of the three phases are each in a symmetrical shape, and the deviation of the estimated position is eliminated.

The correction by the multiplication of the three-phase position estimation signals by the gains according to the current may be replaced with a correction through computation by variably setting the current derivative detection gains gu, gv, gw (hereinafter often referred to generally as "gain(s) guvw") according to the current. For example, the gains guvw for the respective motor phases may be determined based on the absolute values |Iuvw| of the line currents Iuvw of the respective motor phases according to the function represented by the following expression (36). According to the function of the expression (36), when the absolute value of the line current Iuvw of a phase is not greater than a first constant $I_1$ ($I_1>0$), a gain guvw for the phase is a constant first gain $g_1$ ($g_1>0$). When the absolute value of the line current Iuvw of a phase is greater than a second constant $I_2$ ($I_2>I_1$), a gain guvw for the phase is a constant second gain $g_2$ ($g_2>g_1$). Further, when the absolute value of the line current Iuvw of a phase is greater than the first constant $I_1$ and not greater than the second constant $I_2$, a gain guvw for the phase linearly varies between the first gain $g_1$ and the second gain $g_2$ according to the absolute value of the line current Iuvw of the phase.

$$g_{uvw} = \begin{cases} g_1 & (0 \leq |I_{uvw}| \leq I_1) \\ \dfrac{(g_1 - g_2)|I_{uvw}| - g_1 I_2 + g_2 I_2}{I_1 - I_2} & (I_1 < |I_{uvw}| \leq I_2) \\ g_2 & (I_2 < |I_{uvw}|) \end{cases} \quad (36)$$

The constants $I_1$, $I_2$, $g_1$, $g_2$ may be defined by preliminarily measuring the current derivative detection gains for the motor current and fitting the resulting measurements in the expression (36). Further, the results of the fitting may be tabulated, and the gains guvw for the respective phases may be determined according to the current with reference to the resulting table.

The gains guvw may be defined by a function additionally containing a higher-order term in the expression (36).

The gains of the current derivative detectors 4uvw do not influence the change in the signal amplitude. At an electrical angle of 0 degree, the d-axis excitation occurs to enhance the magnetic flux of the magnet. At an electrical angle of 180 degrees, the d-axis reverse excitation occurs in such a direction as to reduce the magnetic flux of the magnet. A magnet-free state is approached by the reduction of the magnetic flux of the magnet, whereby the position dependence of the inductance occurring due to the saturation of the core is eliminated. Therefore, the signal amplitude is changed.

The correction is performed by multiplying the three-phase position estimation signals by the gains according to the current. Thus, detection elements such as current transformers including magnetic bodies can be used for the current derivative detectors 4uvw, even if the current ripples are minute. This makes it possible to detect the current derivatives at a higher sensitivity.

Even without the use of the current derivative detection elements such as the current transformers, it is generally difficult to completely equalize the current derivative detection gains for all the U-phase, the V-phase and the W-phase. Where the three-phase current derivative detection gains are different from each other, the position estimation error can be reduced by the aforementioned computation process.

In the aforementioned sensorless control utilizing the estimated position, there is an uncertainty occurring because the estimated position appears twice in the form of two-cycle signal in each motor electrical angle cycle. Therefore, the initial excitation position is liable to have an opposite phase. If this is problematic, for example, an initial position estimation method utilizing magnetic saturation (see, for example, NPL 1) may be used in combination with the aforementioned computation process to determine the initial excitation position. In this embodiment, the estimated position is determined on the αβ fixed coordinate system. Therefore, if the excitation phase offset of the initial excitation due to the opposite phase of the initial excitation position is not problematic, the two-cycle signal of the estimated position is converted to a one-cycle signal, which may be directly used on the dq transformation coordinate system. Thus, the motor can be rotated in synchronism without performing the initial position estimation.

While the embodiment of the present invention has thus been described, the present invention may be embodied in some other ways.

In the embodiment described above, the current derivatives are directly detected by the current derivative detectors 4uvw by way of example. Alternatively, current changes (current variations) may be detected. For example, differences between currents before and after the application of position detection voltage vectors may be detected.

It should be understood that various design modifications may be made within the scope of the present invention defined by the appended claims.

REFERENCE SIGNS LIST

1: Controller
1a: Processor
1b: Memory
2: Inverter
3u, 3v, 3w: Current detectors
4u, 4v, 4w: Current derivative detectors
5v, 5w: Windings
9u, 9v, 9w: Current lines
13: Current controller
14: PWM generator
15: Position estimator
100: Motor control device
131: dq current controller
132: Inverse dq transformer
135: dq transformer
151: Rotor angle computer
152: Compensator

The invention claimed is:

1. An AC motor control device that controls an inverter adapted to supply an alternating current to an AC motor which is a three-phase permanent magnet synchronous motor, the AC motor control device comprising:
a pulse width modulation signal generation circuit that supplies a pulse width modulation signal to the inverter so that plural types of voltage vectors including a position detection voltage vector for detection of a position of a rotor of the AC motor are applied to the AC motor;
a current derivative detector that detects a current derivative which is a differential value of a current of the AC motor occurring due to application of the position detection voltage vector to the AC motor;
a rotor position computation circuit that computes an estimated position of the rotor of the AC motor based on the current derivative detected by the current derivative detector;
a rotor position correction circuit that corrects the estimated position according to a q-axis current value; and
a drive control circuit that controls the pulse width modulation signal generation circuit so as to drive the AC motor according to the estimated position corrected by the rotor position correction circuit, wherein
the rotor position correction circuit corrects the estimated position computed by the rotor position computation circuit by subtracting a correction amount from the estimated position computed by the rotor position computation circuit, the correction amount being defined by a product of a function of the q-axis current value and a harmonic component having a phase defined by the estimated position computed by the rotor position computation circuit.

2. An AC motor control device that controls an inverter adapted to supply an alternating current to an AC motor which is a three-phase permanent magnet synchronous motor, the AC motor control device comprising:
a pulse width modulation signal generation circuit that supplies a pulse width modulation signal to the inverter so that plural types of voltage vectors including a position detection voltage vector for detection of a position of a rotor of the AC motor are applied to the AC motor;
a current derivative detector that detects a current derivative which is a differential value of a current of the AC motor occurring due to application of the position detection voltage vector to the AC motor;
a rotor position computation circuit that computes an estimated position of the rotor of the AC motor based on the current derivative detected by the current derivative detector;
a rotor position correction circuit that corrects the estimated position according to a q-axis current value; and
a drive control circuit that controls the pulse width modulation signal generation circuit so as to drive the AC motor according to the estimated position corrected by the rotor position correction circuit, wherein
the rotor position correction circuit performs:
a first correction to correct the estimated position computed by the rotor position computation circuit by subtracting a first correction amount from the estimated position computed by the rotor position computation circuit, the first correction amount being defined by a function of the q-axis current value; and
a second correction to further correct the estimated position corrected by the first correction by subtracting a second correction amount from the estimated position corrected by the first correction, the second correction amount being defined by a product of a function of the q-axis current value and a harmonic component having a phase defined by the estimated position corrected by the first correction.

3. The AC motor control device according to claim 1, wherein the rotor position correction circuit corrects the estimated position so as to shift the estimated position in a direction in which the AC motor generates a torque according to the q-axis current value.

4. The AC motor control device according to claim 1, wherein the pulse width modulation signal generation circuit supplies the pulse width modulation signal to the inverter so that an inverse voltage vector obtained by inverting the position detection voltage vector can be applied to the AC motor subsequently to the position detection voltage vector.

5. The AC motor control device according to claim 1, wherein the rotor position computation circuit generates three-phase position estimation signals represented by a cyclic symmetric polynomial and each defined by determining a difference between current derivatives of the same phase or different phases when different voltage vectors are applied to the AC motor, and computes the estimated position of the rotor of the AC motor by using the three-phase position estimation signals.

6. The AC motor control device according to claim 1, wherein the rotor position computation circuit generates three-phase position estimation signals each defined by determining a difference between current derivatives of the same phase when different voltage vectors are applied to the AC motor, and computes the estimated position of the rotor of the AC motor by using the three-phase position estimation signals.

7. A drive system comprising:
an AC motor which is a three-phase permanent magnet synchronous motor;
an inverter that supplies an alternating current to the AC motor; and
an AC motor control device that controls the inverter;
wherein the AC motor control device is the AC motor control device according to claim 1.

8. The AC motor control device according to claim 2, wherein the rotor position correction circuit corrects the estimated position so as to shift the estimated position in a direction in which the AC motor generates a torque according to the q-axis current value.

9. The AC motor control device according to claim 2, wherein the pulse width modulation signal generation circuit supplies the pulse width modulation signal to the inverter so that an inverse voltage vector obtained by inverting the position detection voltage vector can be applied to the AC motor subsequently to the position detection voltage vector.

10. The AC motor control device according to claim 2, wherein the rotor position computation circuit generates three-phase position estimation signals represented by a cyclic symmetric polynomial and each defined by determining a difference between current derivatives of the same phase or different phases when different voltage vectors are applied to the AC motor, and computes the estimated position of the rotor of the AC motor by using the three-phase position estimation signals.

11. The AC motor control device according to claim 2, wherein the rotor position computation circuit generates three-phase position estimation signals each defined by determining a difference between current derivatives of the same phase when different voltage vectors are applied to the AC motor, and computes the estimated position of the rotor of the AC motor by using the three-phase position estimation signals.

12. A drive system comprising:
    an AC motor which is a three-phase permanent magnet synchronous motor;
    an inverter that supplies an alternating current to the AC motor; and
    an AC motor control device that controls the inverter;
    wherein the AC motor control device is the AC motor control device according to claim 2.

* * * * *